United States Patent
Bao et al.

(10) Patent No.: US 11,099,693 B2
(45) Date of Patent: Aug. 24, 2021

(54) TOUCH-SENSING DISPLAY SUBSTRATE, TOUCH-SENSING DISPLAY APPARATUS, METHOD OF OPERATING TOUCH-SENSING DISPLAY APPARATUS, AND METHOD OF FABRICATING TOUCH-SENSING DISPLAY SUBSTRATE

(71) Applicants: BEIJING BOE DISPLAY TECHNOLOGY CO., LTD., Beijing (CN); BOE Technology Group Co., Ltd., Beijing (CN)

(72) Inventors: Zhiying Bao, Beijing (CN); Shijun Wang, Beijing (CN); Bo Feng, Beijing (CN); Wenkai Mu, Beijing (CN); Wenjun Xiao, Beijing (CN); Haoliang Ji, Beijing (CN); Xiaoxiao Chen, Beijing (CN); Ji Dong, Beijing (CN); Bingqing Yang, Beijing (CN); Tianxin Zhao, Beijing (CN); Hao Xu, Beijing (CN); Yang Wang, Beijing (CN)

(73) Assignees: BEIJING BOE DISPLAY TECHNOLOGY CO., LTD., Beijing (CN); BOE Technology Group Co., Ltd., Beijing (CN)

(*) Notice: Subject to any disclaimer, the term of this patent is extended or adjusted under 35 U.S.C. 154(b) by 22 days.

(21) Appl. No.: 16/638,436
(22) PCT Filed: Sep. 17, 2019
(86) PCT No.: PCT/CN2019/106200
§ 371 (c)(1),
(2) Date: Feb. 11, 2020
(87) PCT Pub. No.: WO2020/173081
PCT Pub. Date: Sep. 3, 2020

(65) Prior Publication Data
US 2021/0216164 A1 Jul. 15, 2021

(30) Foreign Application Priority Data
Feb. 26, 2019 (CN) .................. 201910142492.0
Feb. 26, 2019 (CN) .................. 201910143211.3

(51) Int. Cl.
*G06F 3/044* (2006.01)
*G06F 3/041* (2006.01)

(52) U.S. Cl.
CPC ........ *G06F 3/0443* (2019.05); *G06F 3/04164* (2019.05); *G06F 2203/04107* (2013.01)

(58) Field of Classification Search
CPC ............... G06F 3/0412; G06F 3/0443; G06F 2203/04103; G06F 3/044; G06F 3/041; G06F 3/0446
(Continued)

(56) References Cited

U.S. PATENT DOCUMENTS 9,250,751 B2* 2/2016 Philipp ................. G06F 3/0443
2015/0153875 A1 6/2015 Zhang
(Continued)

FOREIGN PATENT DOCUMENTS

CN 103294312 A 9/2013
CN 104020893 A 9/2014
(Continued)

OTHER PUBLICATIONS

International Search Report & Written Opinion dated Dec. 18, 2019, regarding PCT/CN2019/106200.
(Continued)

*Primary Examiner* — Koosha Sharifi-Tafreshi
(74) *Attorney, Agent, or Firm* — Intellectual Valley Law, P.C.

(57) ABSTRACT

A touch-sensing display substrate is provided. The touch-sensing display substrate includes a touch-sensing structure.
(Continued)

The touch-sensing structure includes a plurality of first touch-sensing signal lines; a plurality of first touch-sensing electrodes; and a first insulating layer between the plurality of first touch-sensing signal lines and the plurality of first touch-sensing electrodes. A plurality of first vias at least partially extend into the first insulating layer. The plurality of first vias include at least a through-hole via, through which the respective one of the plurality of first touch-sensing signal lines is electrically connected to a corresponding first touch-sensing electrode. The plurality of first vias include at least a blind via partially extending into the first insulating layer in a region where the respective one of the plurality of first touch-sensing signal lines crosses over one of the plurality of first touch-sensing electrodes other than the corresponding first touch-sensing electrode.

20 Claims, 14 Drawing Sheets

(58) Field of Classification Search
USPC .................................................. 345/173–174
See application file for complete search history.

(56) References Cited

U.S. PATENT DOCUMENTS

| | | | |
|---|---|---|---|
| 2015/0378390 A1 | 12/2015 | Liu et al. | |
| 2016/0026291 A1* | 1/2016 | Zhao | G06F 3/04164 |
| | | | 345/174 |
| 2016/0216802 A1 | 7/2016 | Bao et al. | |
| 2016/0274716 A1 | 9/2016 | Liu et al. | |
| 2016/0291721 A1* | 10/2016 | Shepelev | G06F 3/0443 |
| 2016/0291727 A1 | 10/2016 | Cao | |
| 2016/0357312 A1 | 12/2016 | Li | |
| 2016/0370917 A1 | 12/2016 | Li et al. | |
| 2016/0378254 A1* | 12/2016 | Wang | G06F 3/0443 |
| | | | 345/174 |
| 2018/0292934 A1 | 10/2018 | Xu et al. | |
| 2020/0004361 A1* | 1/2020 | Kim | G02F 1/1368 |

FOREIGN PATENT DOCUMENTS

| | | |
|---|---|---|
| CN | 104102402 A | 10/2014 |
| CN | 104503648 A | 4/2015 |
| CN | 104503650 A | 4/2015 |
| CN | 104571765 A | 4/2015 |
| CN | 104965622 A | 10/2015 |
| CN | 106055160 A | 10/2016 |
| CN | 205810812 U | 12/2016 |
| CN | 109212839 A | 1/2019 |
| WO | 2018036179 A1 | 3/2018 |

OTHER PUBLICATIONS

First Office Action in the Chinese Patent Application No. 201910143211.3, dated Apr. 17, 2019; English translation attached.

* cited by examiner

TOUCH-SENSING DISPLAY SUBSTRATE, TOUCH-SENSING DISPLAY APPARATUS, METHOD OF OPERATING TOUCH-SENSING DISPLAY APPARATUS, AND METHOD OF FABRICATING TOUCH-SENSING DISPLAY SUBSTRATE

CROSS-REFERENCE TO RELATED APPLICATION

This application is a national stage application under 35 U.S.C. § 371 of International Application No. PCT/CN2019/106200, filed Sep. 17, 2019, which claims priority to Chinese Patent Application No. 201910143211.3, filed Feb. 26, 2019, and Chinese Patent Application No. 201910142492.0, filed Feb. 26, 2019. Each of the forgoing applications is herein incorporated by reference in its entirety for all purposes.

TECHNICAL FIELD

Touch control display panels have found a wide range of applications in the display field such as mobile phones, computer display panels, touch screens, satellite navigation devices, and digital cameras. Touch control display panels can be categorized into three classes: add-on type touch panels, on-cell type touch panels, and in-cell type touch panels. Touch control display panels may be a self-capacitive type or a mutual capacitive type touch display panel. Touch control display panels may use mesh electrodes as the touch electrodes or use metal oxide materials (e.g., indium tin oxide) as the touch electrode material.

BACKGROUND

In present, the touch-control technology is widely used in cell phones, tablets, and laptops. Products using the touch-control technology have various advantages such as easy to operate, easy to transport, and having a simple user interface.

SUMMARY

In one aspect, the present invention provides a touch-sensing display substrate, comprising a touch-sensing structure configured to detect a touch position; wherein the touch-sensing structure comprises a plurality of first touch-sensing signal lines; a plurality of first touch-sensing electrodes; and a first insulating layer between the plurality of first touch-sensing signal lines and the plurality of first touch-sensing electrodes; wherein a respective one of the plurality of first touch-sensing signal lines crosses over the plurality of first touch-sensing electrodes; a plurality of first vias at least partially extend into the first insulating layer in regions where the plurality of first touch-sensing signal lines cross over the plurality of first touch-sensing electrodes; the plurality of first vias comprises at least a through-hole via, through which the respective one of the plurality of first touch-sensing signal lines is electrically connected to a corresponding first touch-sensing electrode; the plurality of first vias comprise at least a blind via partially extending into the first insulating layer in a region where the respective one of the plurality of first touch-sensing signal lines crosses over one of the plurality of first touch-sensing electrodes other than the corresponding first touch-sensing electrode; and the respective one of the plurality of first touch-sensing signal lines is insulated from the one of the plurality of first touch-sensing electrodes other than the corresponding first touch-sensing electrode.

Optionally, any via of the plurality of first vias in regions where the respective one of the plurality of first touch-sensing signal lines crosses over first touch-sensing electrodes other than the corresponding first touch-sensing electrode is a blind via.

Optionally, any via of the plurality of first vias in a region where the respective one of the plurality of first touch-sensing signal lines crosses over the corresponding first touch-sensing electrode is a through-hole via.

Optionally, a total number of vias of the plurality of first vias in each region where the respective one of the plurality of first touch-sensing signal lines crosses over each of the plurality of first touch-sensing electrodes is substantially same.

Optionally, a respective one of the plurality of first touch-sensing electrodes crosses over the plurality of first touch-sensing signal lines respectively forming a plurality of cross-over regions; the respective one of the plurality of first touch-sensing electrodes is electrically connected to a corresponding first touch-sensing signal line through the through-hole via; the respective one of the plurality of first touch-sensing electrodes is insulated from the plurality of first touch-sensing signal lines other than the corresponding first touch-sensing signal line; the plurality of first vias comprise at least one blind via partially extending into the first insulating layer in a region where the respective one of the plurality of first touch-sensing electrodes crosses over first touch-sensing signal lines other than the corresponding first touch-sensing signal line.

Optionally, any via of the plurality of first vias in regions where the respective one of the plurality of first touch-sensing electrodes crosses over first touch-sensing signal lines other than the corresponding first touch-sensing signal line is a blind via.

Optionally, a total number of vias of the plurality of first vias in each of the plurality of cross-over regions is substantially same.

Optionally, the first insulating layer comprises a first insulating sub-layer on the plurality of first touch-sensing signal lines, and a second insulating sub-layer on a side of the first insulating sub-layer away from the plurality of first touch-sensing signal lines; the through-hole via comprises a first sub-via extending through the first insulating sub-layer, and a second sub-via extending through the second insulating sub-layer; the first sub-via is connected with the second sub-via, allowing the respective one of the plurality of first touch-sensing signal lines to be electrically connected to the corresponding first touch-sensing electrode through the first sub-via and the second sub-via; and the blind via extends into at least the second insulating sub-layer but does not extend through the first insulating sub-layer.

Optionally, the respective one of the plurality of first touch-sensing signal lines crosses over the plurality of first touch-sensing electrodes along a cross-over direction; and a column of multiple first vias along the cross-over direction of the plurality of first vias are evenly distributed.

Optionally, the touch-sensing display substrate further comprises a plurality of auxiliary electrodes respectively connecting the plurality of first touch-sensing electrodes with the plurality of first touch-sensing signal lines; and a second insulating layer between the plurality of auxiliary electrodes and a structure comprising the plurality of first touch-sensing electrodes and the plurality of first touch-sensing signal lines.

Optionally, the touch-sensing display substrate further comprises a plurality of second vias respectively extending through the second insulating layer; wherein a respective one of the plurality of auxiliary electrodes is electrically connected to the respective one of the plurality of first touch-sensing electrodes through a respective one of the plurality of second vias.

Optionally, the touch-sensing display substrate further comprises a plurality of third vias respectively extending through the second insulating layer; wherein a respective one of the plurality of auxiliary electrodes extends through a respective one of the plurality of third vias; and the respective one of the plurality of third vias is connected with the respective one of the plurality of first vias.

Optionally, in a region corresponding to the through-hole via, the respective one of the plurality of third vias is connected with the through-hole via; and the respective one of the plurality of auxiliary electrodes is electrically connected to the respective one of the plurality of first touch-sensing signal lines through the respective one of the plurality of third vias and the through-hole via.

Optionally, in a region corresponding to the blind via, further comprising a plurality of fourth vias and a plurality of fifth vias at least partially extending into the second insulating layer; wherein the blind via comprises a first blind sub-via and a second blind sub-via; the respective one of the plurality of fourth vias is connected with the first blind sub-via; the respective one of the plurality of fifth vias is connected with the second blind sub-via; the respective one of the plurality of auxiliary electrodes is electrically connected to the respective one of the plurality of first touch-sensing electrodes through the respective one of the plurality of fourth vias and the first blind sub-via or through the respective one of the plurality of fifth vias and the second blind sub-via.

Optionally, the touch-sensing display substrate further comprises a second blind via partially extending into the first insulating layer; the respective one of the plurality of auxiliary electrodes at least partially extends into the second blind via; and the region corresponding to the blind via and the region corresponding to the second blind via are non-overlapping.

Optionally, the touch-sensing display substrate further comprises a plurality of pixel electrodes respectively in a plurality of subpixel regions; and a plurality of thin film transistors respectively driving image display in a plurality of subpixels; a drain electrode of a respective one of the plurality of thin film transistors is electrically connected to a respective one of the plurality of pixel electrodes; wherein the plurality of auxiliary electrodes and the plurality of pixel electrodes are in a same layer and comprise a same material.

Optionally, the touch-sensing display substrate further comprises a plurality of second touch-sensing electrodes; and a plurality of second touch-sensing signal lines; a respective one of the plurality of second touch-sensing signal lines is electrically connected to one of the plurality of second touch-sensing electrodes; the respective one of the plurality of second touch-sensing signal lines is substantially parallel to the plurality of second touch-sensing electrodes; and an orthographic projection of the respective one of the plurality of second touch-sensing signal lines on a base substrate at least partially overlaps with an orthographic projection of the one of the plurality of second touch-sensing electrodes on the base substrate.

Optionally, the touch-sensing display substrate further comprises a plurality of first apertures respectively extending through a thickness of the respective one of the plurality of first touch-sensing electrodes; wherein the respective one of the plurality of second touch-sensing electrodes comprises a plurality of second touch-sensing sub-electrodes; in a region where the respective one of the plurality of first touch-sensing electrodes crosses over a respective one of the plurality of second touch-sensing electrodes, second touch-sensing sub-electrodes are in a region corresponding to one or more first apertures; one of the second touch-sensing sub-electrodes of the respective one of the plurality of second touch-sensing electrodes is in a region corresponding to one of the plurality of first apertures corresponding to the respective one of the plurality of first touch-sensing electrodes; the respective one of the plurality of second touch-sensing signal lines connects a column of second touch-sensing sub-electrodes of the plurality of second touch-sensing sub-electrodes in the respective one of the plurality of second touch-sensing electrodes.

Optionally, the touch-sensing display substrate further comprises a plurality of second apertures respectively extending through the respective one of the plurality of first touch-sensing electrodes; wherein any signal line that crosses over multiple first apertures of the plurality of first apertures in multiple first touch-sensing electrodes of the plurality of first touch-sensing electrodes is absent in regions corresponding to the plurality of second apertures; and any signal line that crosses over multiple second apertures of the plurality of second apertures in multiple first touch-sensing electrodes of the plurality of first touch-sensing electrodes is absent in regions corresponding to the plurality of first apertures.

Optionally, the touch-sensing display substrate further comprises a plurality of connecting lines respectively connected to the plurality of first touch-sensing signal lines; wherein the respective one of the plurality of first touch-sensing signal lines is between a respective one of the plurality of connecting lines and the respective one of the plurality of first touch-sensing electrodes.

Optionally, the plurality of the first vias are arranged in array and evenly distributed throughout the touch-sensing display substrate.

In another aspect, the present invention provides a touch-sensing display apparatus, comprising the touch-sensing display substrate described herein, and one or more integrated circuits connected to the touch-sensing display substrate.

Optionally, the touch-sensing display apparatus is operated in a time division mode comprising a display mode and a touch control mode; wherein, in the display mode, the plurality of first touch-sensing electrodes are used as a common electrode and are configured to be provided with a common voltage; wherein, in the touch control mode, the plurality of first touch-sensing electrodes are a plurality of touch-sensing electrodes configured to transmit touch signals.

In another aspect, the present invention provides a method of operating a touch-sensing display apparatus, comprising operating a touch-sensing display apparatus in a time division mode comprising a display mode and a touch control mode; in the display mode, applying a common voltage to a plurality of first touch-sensing electrodes; in the touch control mode, transmitting touch signals using the plurality of first touch-sensing electrodes.

In another aspect, the present invention provides a method of fabricating a touch-sensing display substrate, comprising forming a touch-sensing structure on a base substrate; wherein forming the touch-sensing structure comprises forming a plurality of first touch-sensing signal lines and a plurality of first touch-sensing electrodes, a respective one of the plurality of first touch-sensing signal lines formed to cross over the plurality of first touch-sensing electrodes; forming a first insulating layer between the plurality of first touch-sensing signal lines and the plurality of first touch-sensing electrodes; and forming a plurality of first vias at least partially extending into the first insulating layer in regions where the plurality of first touch-sensing signal lines cross over the plurality of first touch-sensing electrodes; wherein the plurality of first vias are formed to comprise at least a through-hole via, through which the respective one of the plurality of first touch-sensing signal lines is electrically connected to a corresponding first touch-sensing electrode; the plurality of first vias are formed to comprise at least a blind via partially extending into the first insulating layer in a region where the respective one of the plurality of first touch-sensing signal lines crosses over one of the plurality of first touch-sensing electrodes other than the corresponding first touch-sensing electrode; and the respective one of the plurality of first touch-sensing signal lines is formed to be insulated from the one of the plurality of first touch-sensing electrodes other than the corresponding first touch-sensing electrode.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a touch-sensing display substrate, a touch-sensing display apparatus, a method of operating a touch-sensing display apparatus, and a method of fabricating a touch-sensing display substrate that substantially obviate one or more of the problems due to limitations and disadvantages of the related art. In one aspect, the present disclosure provides a touch-sensing display substrate. In some embodiments, the touch-sensing display substrate includes a touch-sensing structure configured to detect a touch position. In some embodiments, the touch-sensing structure includes a plurality of first touch-sensing signal lines; a plurality of first touch-sensing electrodes; and a first insulating layer between the plurality of first touch-sensing signal lines and the plurality of first touch-sensing electrodes. Optionally, a respective one of the plurality of first touch-sensing signal lines crosses over the plurality of first touch-sensing electrodes. Optionally, a plurality of first vias at least partially extend into the first insulating layer in regions where the plurality of first touch-sensing signal lines cross over the plurality of first touch-sensing electrodes. Optionally, the plurality of first vias includes at least a through-hole via, through which the respective one of the plurality of first touch-sensing signal lines is electrically connected to a corresponding first touch-sensing electrode. Optionally, the plurality of first vias includes at least a blind via partially extending into the first insulating layer in a region where the respective one of the plurality of first touch-sensing signal lines crosses over one of the plurality of first touch-sensing electrodes other than the corresponding first touch-sensing electrode. Optionally, the respective one of the plurality of first touch-sensing signal lines is insulated from the one of the plurality of first touch-sensing electrodes other than the corresponding first touch-sensing electrode.

Figure 1:
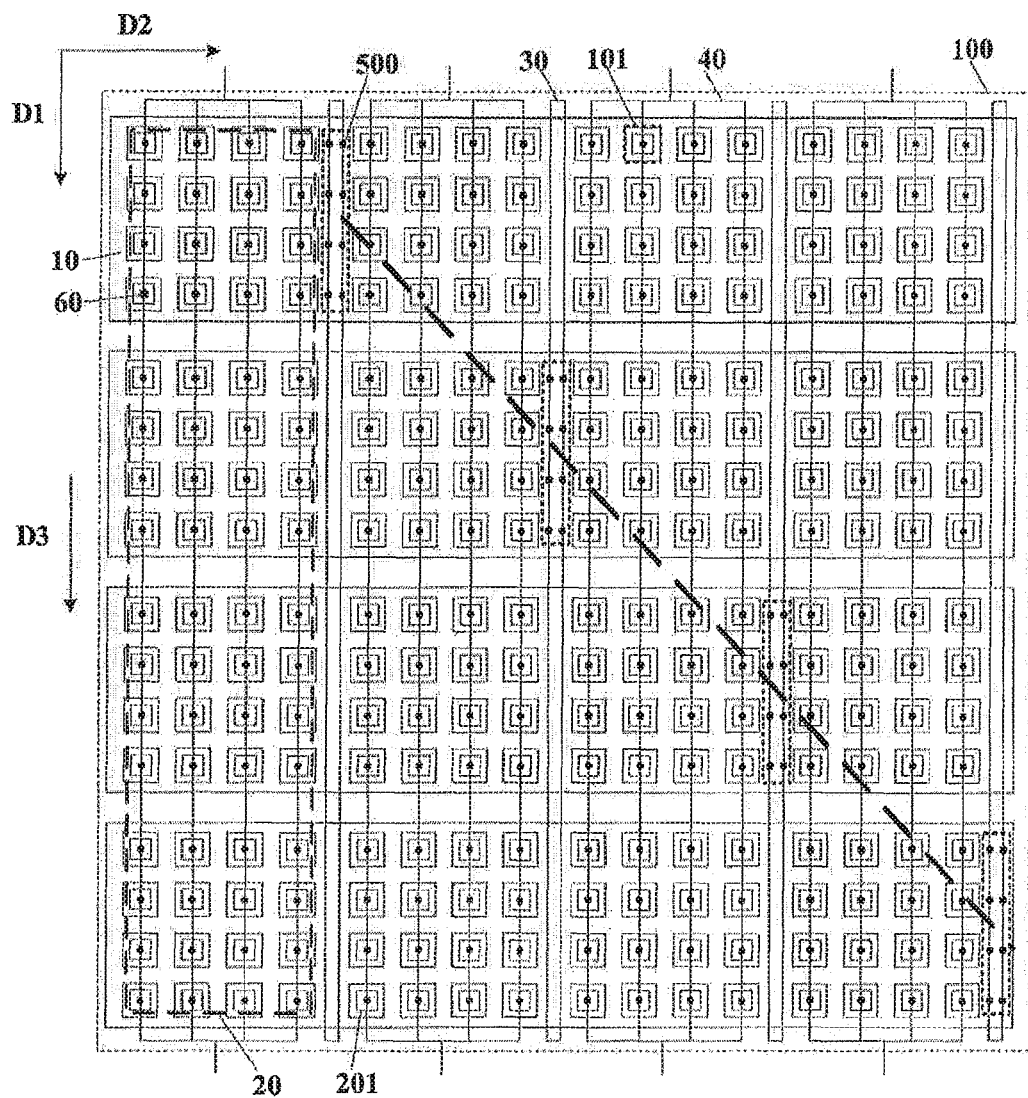
FIG. 1 is a schematic diagram of a structure of a touch-sensing display substrate in some embodiments according to the present disclosure.

FIG. 1 is a schematic diagram of a structure of a touch-sensing display substrate in some embodiments according to the present disclosure. Referring to FIG. 1, in some embodiments, the touch-sensing display substrate includes a touch-sensing structure 100 configured to detect a touch position.

In some embodiments, the touch-sensing display substrate includes a touch-sensing structure 100. Optionally, the touch-sensing structure includes a plurality of first touch-sensing electrodes 10 arranged along a first direction D1; and a plurality of second touch-sensing electrodes 20 arranged along a second direction D2. Optionally, the first direction D1 is different from the second direction D2. For example, the first direction D1 crosses over the second direction D2. Optionally, a respective one of the plurality of the plurality of first touch-sensing electrodes 10 extends along the second direction D2. Optionally, a respective one of the plurality of second touch-sensing electrodes 20 extends along the first direction D.

In some embodiments, the touch-sensing display substrate further includes a plurality of first apertures 101 respectively extending through a thickness of the respective one of the plurality of first touch-sensing electrodes 10. Optionally, the respective one of the plurality of second touch-sensing electrodes 20 includes a plurality of second touch-sensing sub-electrodes 201. Optionally, one of the second touch-sensing sub-electrodes 201 of the respective one of the plurality of second touch-sensing electrodes 20 is in a region corresponding to one of the plurality of first apertures 101 corresponding to the respective one of the plurality of first touch-sensing electrodes 10. Optionally, the plurality of first touch-sensing electrodes 10 is insulated from the plurality of second touch-sensing electrodes 20.

In order to fabricate a display apparatus having a narrow frame by using the touch-sensing display substrate described herein, integrated circuits connected to the touch-sensing structure are arranged on a same side of a peripheral area of the touch-sensing display substrate. As used herein the term "peripheral area" refers to an area of a touch-sensing display substrate (e.g., an opposing substrate or an array substrate) in a display apparatus where various circuits and wires are provided to transmit signals to the touch-sensing display substrate. To increase the transparency of the touch-sensing display apparatus, non-transparent or opaque components of the touch-sensing display apparatus (e.g., battery, printed circuit board, metal frame), can be disposed in the peripheral area rather than in the display areas.

In some embodiments, the touch-sensing structure further includes a plurality of first touch-sensing signal lines 30 and a plurality of second touch-sensing signal lines 40. Optionally, the plurality of first touch-sensing signal lines 30 and the plurality of second touch-sensing signal lines 40 extend along a same direction. For example, the plurality of first touch-sensing signal lines 30 and the plurality of second touch-sensing signal lines 40 extend along the first direction D1.

Optionally, the plurality of second touch-sensing electrodes 20 extends along a same direction (e.g., the first direction D1) along which the plurality of second touch-sensing signal lines 40 extend. Optionally, the respective one of the plurality of second touch-sensing signal lines 40 connects a column of second touch-sensing sub-electrodes of the plurality of second touch-sensing sub-electrodes 201 in the respective one of the plurality of second touch-sensing electrodes 20. So, a plurality of touch-sensing vias 60 extending through an insulating layer between the plurality of second touch-sensing electrodes 20 and the plurality of second touch-sensing signal lines 40 are evenly distributed on the insulating layer to allow the respective one of the plurality of second touch-sensing signal lines 40 to be electrically connected to a corresponding second touch-sensing electrode.

Optionally, the plurality of first touch-sensing electrodes 10 extend along the second direction D2, but the plurality of first touch-sensing signal lines 30 extend along the first direction D1. Optionally, in regions where the respective one of the plurality of first touch-sensing signal lines 30 crosses over a corresponding first touch-sensing electrode, the respective one of the plurality of first touch-sensing signal lines 30 is electrically connected to the corresponding first touch-sensing electrode through at least a through-hole via 500 extending through an insulating layer between the plurality of first touch-sensing signal lines 30 and the corresponding first touch-sensing electrode. So, in a region where the respective one of the plurality of first touch-sensing signal lines 30 crosses over one of the plurality of first touch-sensing electrodes 10 other than the corresponding first touch-sensing electrode, the respective one of the plurality of first touch-sensing signal lines 30 is insulated from the one of the plurality of first touch-sensing electrodes 10 other than the corresponding first touch-sensing electrode, and though-hole vias are absent in the region where the respective one of the plurality of first touch-sensing signal lines 30 crosses over one of the plurality of first touch-sensing electrodes 10 other than the corresponding first touch-sensing electrode. The arrangement will lead to an uneven distribution of the through-hole vias on the touch-sensing display substrate.

For example, FIG. 1 shows an example that the through-hole vias are arranged along an oblique direction from a top left corner of the touch-sensing display substrate to a bottom right corner of the touch-sensing display substrate. The uneven distribution of the through-hold vias would have an adverse effect on the display uniformity of the touch-sensing display substrate.

Figure 2:
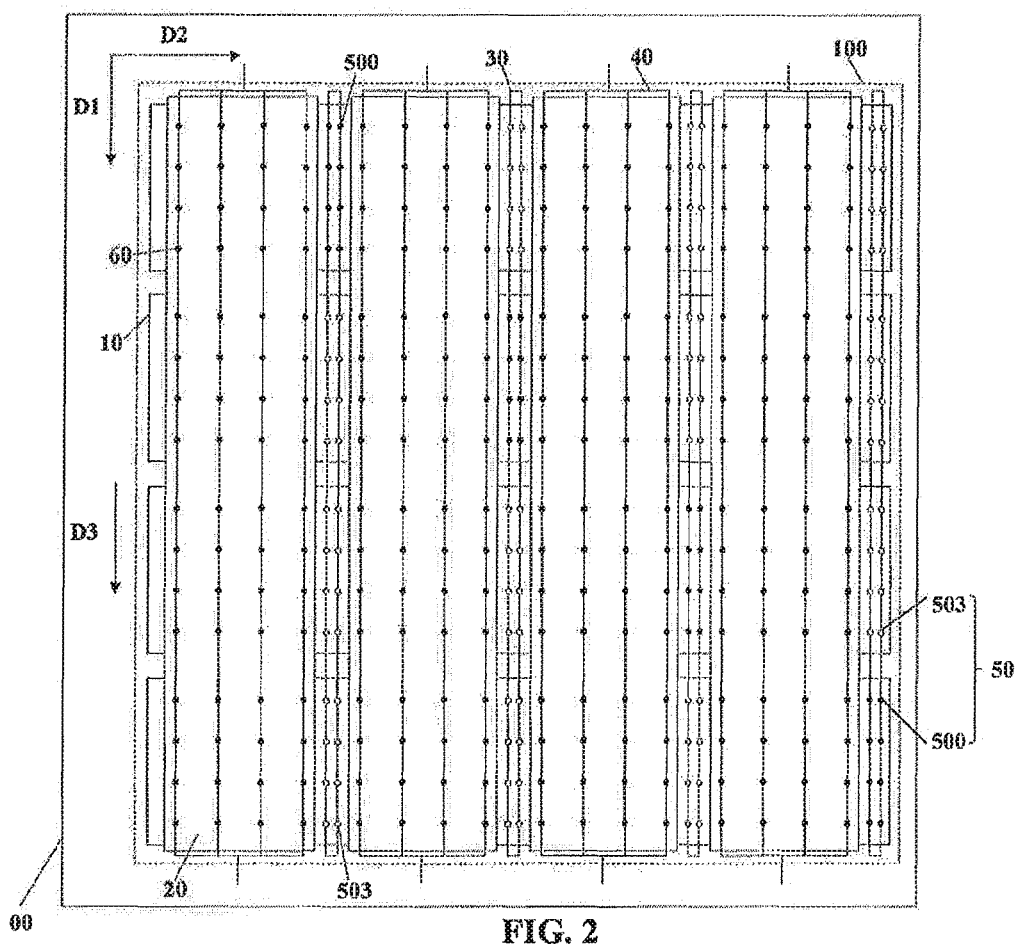
FIG. 2 is a schematic diagram of a structure of a touch-sensing display substrate in some embodiments according to the present disclosure.
Figure 3A:
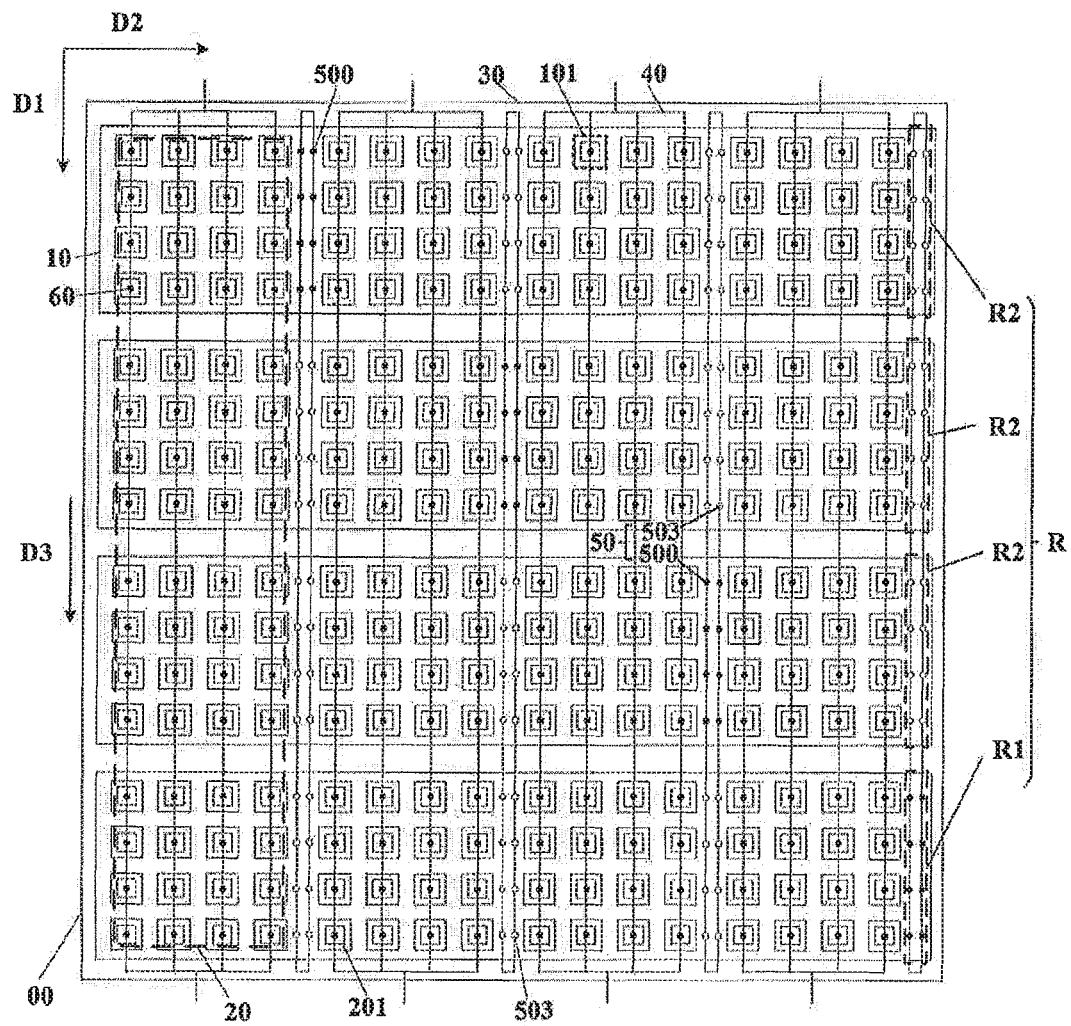
FIG. 3A is a schematic diagram of a structure of a touch-sensing display substrate in some embodiments according to the present disclosure.
Figure 3B:
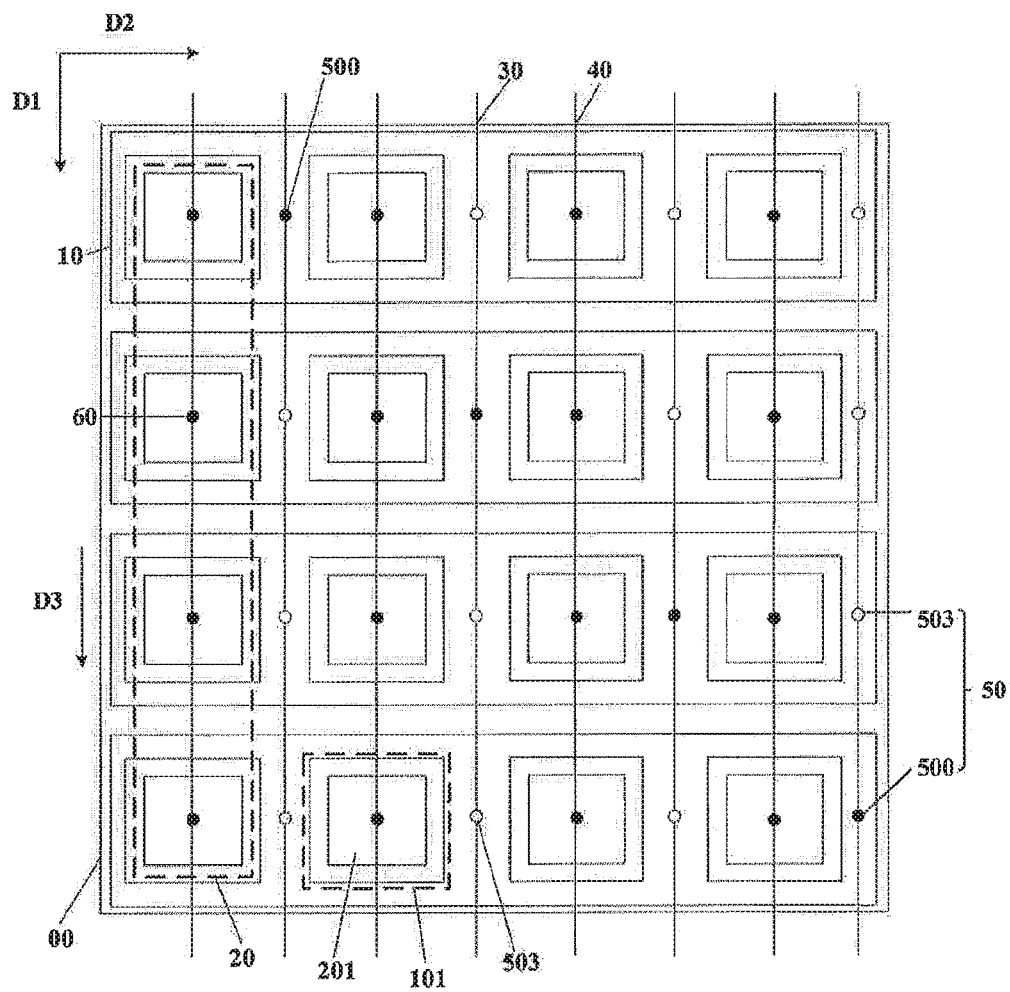
FIG. 3B is a schematic diagram of a structure of a touch-sensing display substrate in some embodiments according to the present disclosure.
Figure 4:
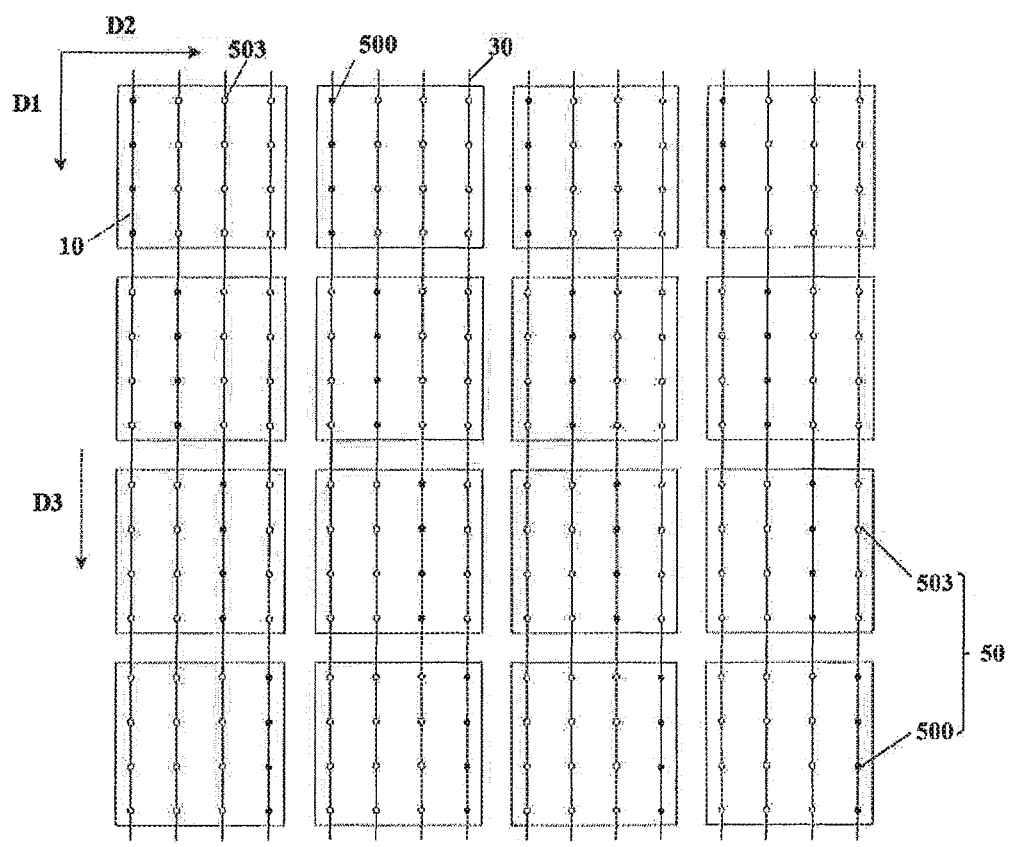
FIG. 4 is a schematic diagram of a structure of a touch-sensing display substrate in some embodiments according to the present disclosure.

FIG. 2 is a schematic diagram of a structure of a touch-sensing display substrate in some embodiments according to the present disclosure. FIG. 3A is a schematic diagram of a structure of a touch-sensing display substrate in some embodiments according to the present disclosure. FIG. 3B is a schematic diagram of a structure of a touch-sensing display substrate in some embodiments according to the present disclosure. FIG. 4 is a schematic diagram of a structure of a touch-sensing display substrate in some embodiments according to the present disclosure.

Referring to FIG. 2 to FIG. 4, in some embodiments, the touch-sensing display substrate includes a touch-sensing structure 100 configured to detect a touch position. In some embodiments, the touch-sensing structure 100 includes a plurality of first touch-sensing signal lines 30, and a plurality of first touch-sensing electrodes 10. Optionally, a respective one of the plurality of first touch-sensing signal lines 30 crosses over the plurality of first touch-sensing electrodes 10. Optionally, the respective one of the plurality of first touch-sensing signal lines 30 is electrically connected to a corresponding first touch-sensing electrode.

Referring to FIG. 2, FIG. 3A, and FIG. 3B, in some embodiments, the touch-sensing structure includes a plurality of first touch-sensing electrodes 10 arranged along a first direction D1 and extending along a second direction D2. In order to detect a touch position, the touch-sensing structure further includes a plurality of second touch-sensing electrodes 20 arranged along the second direction D2 and extending along the first direction D1; and a plurality of second touch-sensing signal lines 40 extending along the first direction D1. Optionally, a respective one of the plurality of second touch-sensing signal lines 40 is electrically connected to a corresponding second touch-sensing electrode (e.g., one of the plurality of second touch-sensing electrodes 20). Optionally, the first direction D1 is different from the second direction D2. Optionally, the respective one of the plurality of second touch-sensing signal lines 40 is substantially parallel to the plurality of second touch-sensing electrodes 20. Optionally, an orthographic projection of the respective one of the plurality of second touch-sensing signal lines 40 on a base substrate 00 at least partially overlaps with an orthographic projection of the one of the plurality of second touch-sensing electrodes 20 on the base substrate 00.

Optionally, the respective one of the plurality of first touch-sensing electrodes 10 is insulated from the plurality of second touch-sensing electrodes 20. Optionally, the respective one of the plurality of second touch-sensing electrodes 20 is insulated from the plurality of first touch-sensing electrodes 10.

Optionally, the respective one of the plurality of first touch-sensing electrodes 10 is a transmitting (TX) electrode (e.g., a scanning electrode), and the respective one of the plurality of second touch-sensing electrodes 20 is a receiving (RX) electrode (e.g., a sensing electrode). The respective one of the plurality of first touch-sensing signal lines 30 electrically connected to the corresponding first touch-sensing electrode is a transmitting line (TX line). The respective one of the plurality of second touch-sensing signal lines 40 electrically connected to the corresponding second touch-sensing electrode is a receiving line (RX line).

Optionally, the respective one of the plurality of second touch-sensing electrodes 20 is a transmitting (TX) electrode, and the respective one of the plurality of first touch-sensing electrodes 10 is a receiving (RX) electrode.

Optionally, referring to FIG. 2, the plurality of first touch-sensing electrodes 10 and the plurality of second touch-sensing electrodes 20 are in different layers. For example, the plurality of first touch-sensing electrodes 10 are insulated from the plurality of second touch-sensing electrodes 20 using an insulating layer.

Optionally, referring to FIG. 3A and FIG. 3B, the plurality of first touch-sensing electrodes 10 and the plurality of second touch-sensing electrodes 20 are in a same layer, the plurality of first touch-sensing electrodes 10 and the plurality of second touch-sensing electrodes 20 can be formed within a same process, which can simplify the process of fabricating the touch-sensing substrate.

As used herein, the term "same layer" refers to the relationship between the layers simultaneously formed in the same step. In one example, the plurality of first touch-sensing electrodes 10 and the plurality of second touch-sensing electrodes 20 are in a same layer when they are formed as a result of one or more steps of a same patterning process performed in a same layer of material. In another example, the plurality of first touch-sensing electrodes 10 and the plurality of second touch-sensing electrodes 20 can be formed in a same layer by simultaneously performing the step of forming the plurality of first touch-sensing electrodes 10 and the step of forming the plurality of second touch-sensing electrodes 20. The term "same layer" does not always mean that the thickness of the layer or the height of the layer in a cross-sectional view is the same.

Various appropriate arrangements of touch-sensing electrodes can be used. For example, the respective one of the plurality of first touch-sensing electrodes is an integral portion including a plurality of first touch-sensing sub-electrodes connected together, and the respective one of the plurality of second touch-sensing electrodes includes a plurality of second touch-sensing sub-electrodes 201 spaced apart from each other. A column of second touch-sensing sub-electrodes of the plurality of second touch-sensing sub-electrodes in the respective one of the plurality of second touch-sensing electrodes are connected by bridges (e.g., signal lines, signal wires). The bridges are insulated from the plurality of first touch-sensing electrodes.

Referring to FIG. 3A, in one example, the touch-sensing display substrate further includes a plurality of first apertures 101 respectively extending through a thickness of the respective one of the plurality of first touch-sensing electrodes 10. The plurality of first apertures 101 are arranged in multiple rows. The respective one of the plurality of second touch-sensing electrodes 20 includes a plurality of second touch-sensing sub-electrodes 201. The plurality of second touch-sensing sub-electrodes 201 are arranged in multiple columns. In a region where multiple row regions corresponding to the plurality of first apertures 101 overlaps with the multiple column regions corresponding to the plurality of second touch-sensing sub-electrodes 201, a respective second touch-sensing sub-electrodes 201 is in a region corresponding to a respective first apertures 101.

Referring to FIG. 3B, in another example, the plurality of first apertures 101 are arranged in one row. The plurality of second touch-sensing sub-electrodes 201 are arranged in one column. In a region where a row region corresponding to the plurality of first apertures 101 overlaps with a column region corresponding to the plurality of second touch-sensing sub-electrodes 201, a respective second touch-sensing sub-electrodes 201 is in a region corresponding to a respective first apertures 101.

Optionally, by using the electrode arrangements in FIG. 3A and FIG. 3B, the plurality of first touch-sensing electrodes 10 and the plurality of second touch-sensing electrodes 20 can be formed in a same layer. Optionally, the plurality of first touch-sensing electrodes 10 and the plurality of second touch-sensing electrodes 20 can be formed in the same process. Optionally, an insulating layer is absent between the plurality of first touch-sensing electrodes 10 and the plurality of second touch-sensing electrodes 20. So, the process of fabricating the touch-sensing display substrate is simplified, and the efficiency of fabricating the touch-sensing display substrate is improved.

When the plurality of first touch-sensing electrodes 10 and the plurality of second touch-sensing electrodes 20 are formed in a same layer, the plurality of first touch-sensing electrodes 10 and the plurality of second touch-sensing electrodes 20 can be used as a common electrode when the plurality of second touch-sensing electrodes 20 performs display function. So, the plurality of first touch-sensing electrodes 10 and the plurality of second touch-sensing electrodes 20 are not only used to perform a touch-control function, but also used to perform a display function. Furthermore, the touch control function and the display function can be performed at the same time, which can obviate the issue of insufficient charging time of data lines. If the touch control function and the display function are performed in a time division fashion, the data line may not be sufficiently charged during the limited charging period. The problem becomes particularly severe in high resolution display panels. Moreover, the present apparatus is compatible with an active pen.

Optionally, the touch-sensing structure 100 further includes a plurality of first touch-sensing signal lines 30 and a plurality of second touch-sensing signal lines 40. Optionally, the plurality of first touch-sensing signal lines 30 and the plurality of second touch-sensing signal lines 40 extend along a same direction. For example, the plurality of first touch-sensing signal lines 30 and the plurality of second touch-sensing signal lines 40 extend along the first direction D1.

Optionally, the plurality of second touch-sensing electrodes 20 extends along a same direction (e.g., the first direction D1) along which the plurality of second touch-sensing signal lines 40 extend. Optionally, the respective one of the plurality of second touch-sensing signal lines 40 connects a column of second touch-sensing sub-electrodes of the plurality of second touch-sensing sub-electrodes 201 in the respective one of the plurality of second touch-sensing electrodes 20.

Optionally, a plurality of touch-sensing vias 60 extending through an insulating layer, between the plurality of second touch-sensing electrodes 20 and the plurality of second touch-sensing signal lines 40, are evenly distributed on the insulating layer to allow the respective one of the plurality of second touch-sensing signal lines 40 to be electrically connected to the corresponding second touch-sensing electrode. For example, a plurality of touch-sensing vias 60 are evenly distributed in regions where the plurality of second touch-sensing signal lines 40 crosses through the plurality of second touch-sensing electrodes 20. The evenly distributed touch-sensing vias 60 will avoid the display uniformity problem and improve the display quality of the touch-sensing display substrate.

In some embodiments, referring to FIG. 4, the plurality of first touch-sensing electrodes 10 are arranged in array. Optionally, an array of the plurality of first touch-sensing electrodes 10 has m rows and n columns, wherein m and n are positive integers, m≥2, n≥2. For example, the array of the plurality of first touch-sensing electrodes 10 has 80 rows and 100 columns. Optionally, the plurality of first touch-sensing electrodes 10 can be used as a common electrode.

When the plurality of first touch-sensing electrodes 10 are used as the common electrode, the touch control function and the display function can be performed by the touch-sensing display substrate. Instead of forming a common electrode, using the plurality of first touch-sensing electrodes 10 as the common electrode can reduce a thickness of the touch-sensing display substrate.

Optionally, the plurality of first touch-sensing electrodes and the plurality of second touch-sensing electrodes are substantially transparent. As used herein, the term "substantially transparent" means at least 50 percent (e.g., at least 60 percent, at least 70 percent, at least 80 percent, at least 90 percent, and at least 95 percent) of an incident light in the visible wavelength range transmitted therethrough.

Various appropriate electrode materials and various appropriate fabricating methods may be used to make the plurality of first touch-sensing electrodes and the plurality of second touch-sensing electrodes. Examples of appropriate electrode materials for making the plurality of first touch-sensing electrodes and the plurality of second touch-sensing electrodes include, but are not limited to, Indium Tin Oxide (ITO), and Indium Zinc Oxide (IZO).

In some embodiments, the touch-sensing display substrate further includes a plurality of gate lines and a plurality of data lines. Optionally, the plurality of first touch-sensing signal lines 30, the plurality of second touch-sensing signal lines 40, and the plurality of data lines are in a same layer. For example, the plurality of first touch-sensing signal lines 30, the plurality of second touch-sensing signal lines 40, and the plurality of data lines can be formed in a same process, and the plurality of first touch-sensing signal lines 30, the plurality of second touch-sensing signal lines 40, and the plurality of data lines are parallel to each other. Optionally, the plurality of first touch-sensing signal lines 30, the plurality of second touch-sensing signal lines 40, and the plurality of gate lines are in a same layer. The plurality of first touch-sensing signal lines 30, the plurality of second touch-sensing signal lines 40, and the plurality of gate lines can be formed in a same process, and the plurality of first touch-sensing signal lines 30, the plurality of second touch-sensing signal lines 40, and the plurality of gate lines are parallel to each other.

Optionally, the touch-sensing display substrate is absent of the plurality of second touch-sensing electrodes 20 and the plurality of second touch-sensing signal lines 40, and only includes the plurality of first touch-sensing electrodes 10 and the plurality of first touch-sensing signal lines 30, the first touch-sensing signal lines 30 is in a same layer as the plurality of gate lines or the plurality of data lines.

Optionally, the touch-sensing display substrate further includes a plurality of common lines. The plurality of common lines is in a same layer as the plurality of gate lines or the plurality of data lines.

Figure 5A:
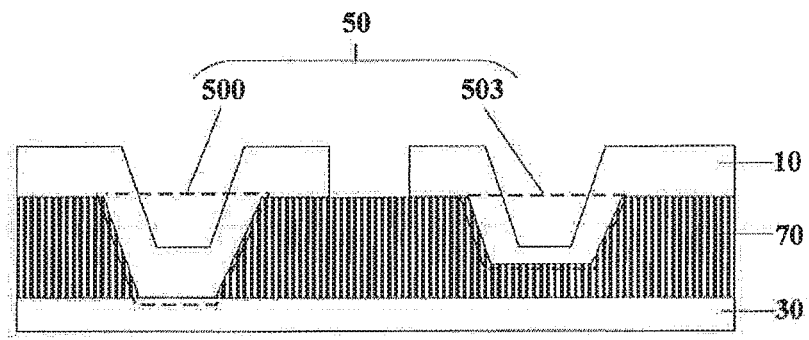
FIG. 5A is a cross-sectional view of a through-hole via and a blind via in some embodiments according to the present disclosure.

FIG. 5A is a cross-sectional view of a through-hole via and a blind via in some embodiments according to the present disclosure. Referring to FIG. 5A, in some embodiments, the touch-sensing display substrate further includes a first insulating layer 70 between the plurality of first touch-sensing signal lines 30 and the plurality of first touch-sensing electrodes 10.

Figure 5B:
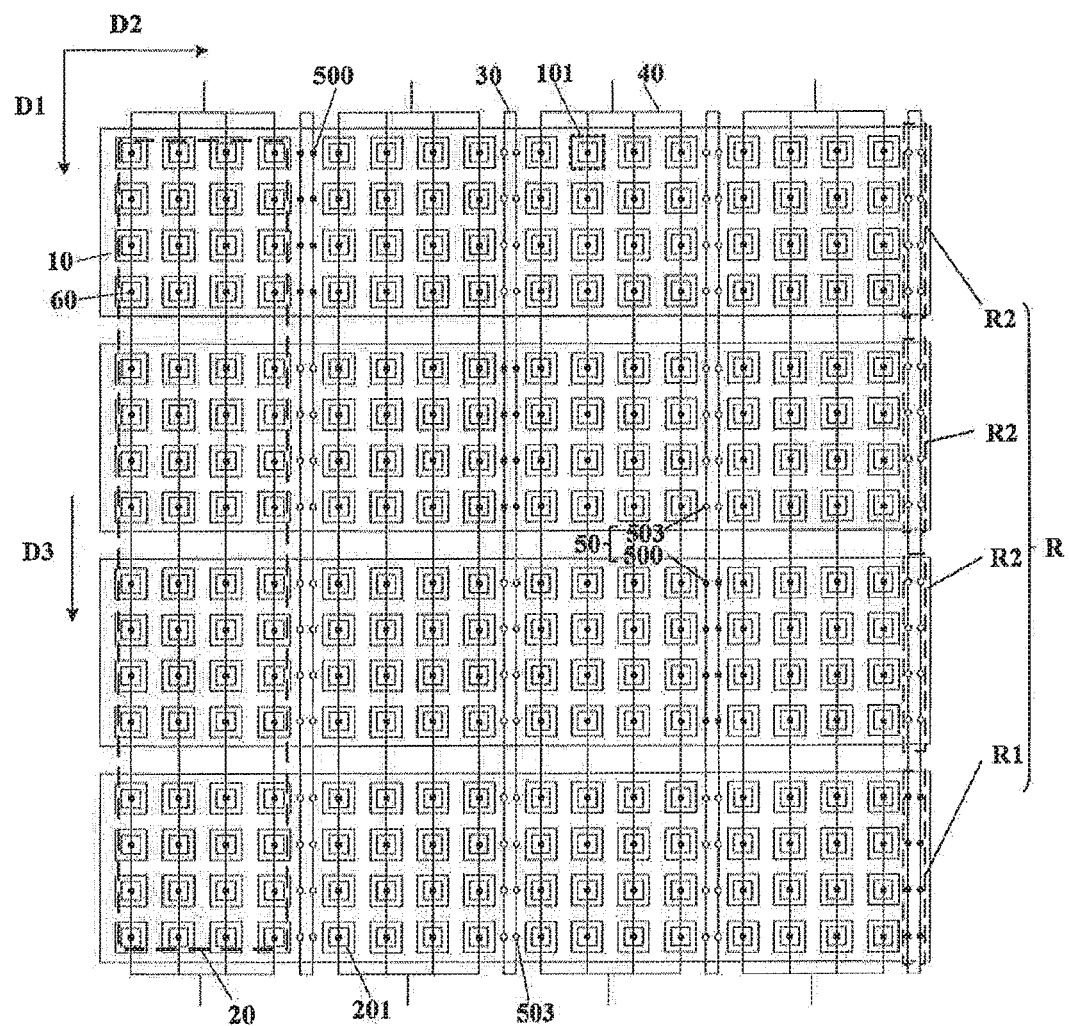
FIG. 5B is a schematic diagram of a structure of a touch-sensing display substrate in some embodiments according to the present disclosure.
Figure 5C:
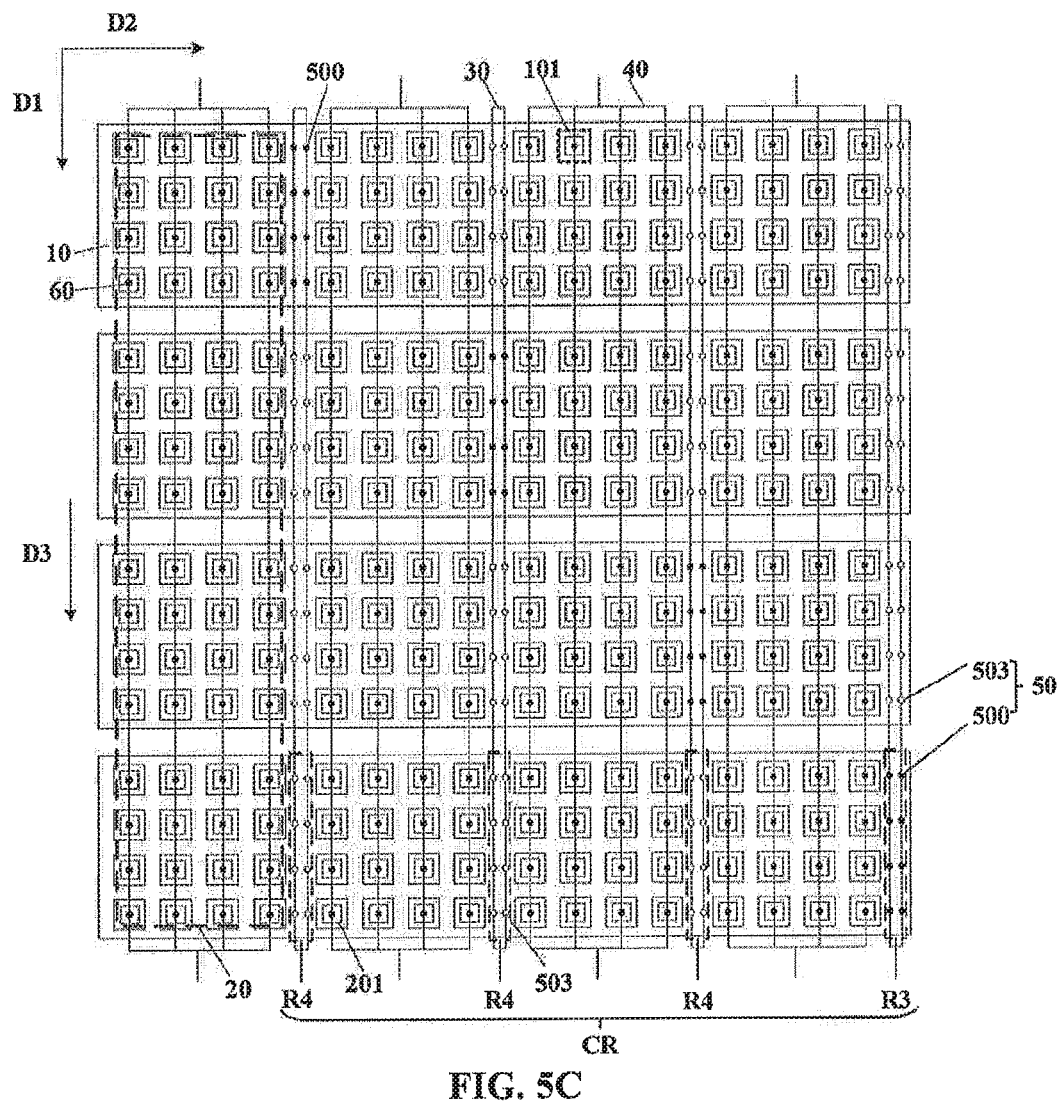
FIG. 5C is a schematic diagram of a structure of a touch-sensing display substrate in some embodiments according to the present disclosure.

FIG. 5B is a schematic diagram of a structure of a touch-sensing display substrate in some embodiments according to the present disclosure. FIG. 5C is a schematic diagram of a structure of a touch-sensing display substrate in some embodiments according to the present disclosure. Referring to FIG. 5A and FIG. 5B, in some embodiments, the touch-sensing display substrate further includes a plurality of first vias 50 at least partially extend into the first insulating layer 70 in regions R where the plurality of first touch-sensing signal lines 30 cross over the plurality of first touch-sensing electrodes 10. In one example, one of the plurality of first vias 50 completely extends through a thickness of the first insulating layer 70. In another example, one of the plurality of first vias 50 partially extends through the first insulating layer 70.

Optionally, the plurality of first vias 50 includes at least a through-hole via 500, through which the respective one of the plurality of first touch-sensing signal lines 30 is electrically connected to a corresponding first touch-sensing electrode. For example, the at least a through-hole via 500 is in a region R1 where the respect one of the plurality of first touch-sensing signal lines 30 crosses over the corresponding first touch sensing electrode, and exposes partial surface of the corresponding first touch sensing electrode.

Optionally, the plurality of first vias 50 includes at least a blind via 503 partially extending into the first insulating layer 70 in a region R2 where the respective one of the plurality of first touch-sensing signal lines crosses over one of the plurality of first touch-sensing electrodes other than the corresponding first touch-sensing electrode.

Optionally, the respective one of the plurality of first touch-sensing signal lines 30 is insulated from the one of the plurality of first touch-sensing electrodes other than the corresponding first touch-sensing electrode.

Optionally, any via of the plurality of first vias 50 in regions R2 where the respective one of the plurality of first touch-sensing signal lines 30 crosses over first touch-sensing electrodes 10 other than the corresponding first touch-sensing electrode is a blind via 503.

Optionally, any via of the plurality of first vias 50 in the region R1 where the respective one of the plurality of first touch-sensing signal lines 30 crosses over the corresponding first touch-sensing electrode is a through-hole via 500.

Optionally, a total number of vias of the plurality of first vias 50 in each region where the respective one of the plurality of first touch-sensing signal lines 30 crosses over each of the plurality of first touch-sensing electrodes 10 is substantially same.

Referring to FIG. 5A and FIG. 5C, in some embodiments, a respective one of the plurality of first touch-sensing electrodes 10 crosses over the plurality of first touch-sensing signal lines 30 respectively forming a plurality of cross-over regions CR.

Optionally, the respective one of the plurality of first touch-sensing electrodes 10 is electrically connected to a corresponding first touch-sensing signal line through the through-hole via 500. For example, the through-hole via 500 is in a region R3 where the respective one of the plurality of first touch-sensing electrodes 10 crosses over the corresponding first touch-sensing signal line.

Optionally, the respective one of the plurality of first touch-sensing electrodes 10 is insulated from the plurality of first touch-sensing signal lines other than the corresponding first touch-sensing signal line. Optionally, the plurality of first vias 50 includes at least one blind via partially extending into the first insulating layer 70 in a region R4 where the respective one of the plurality of first touch-sensing electrodes crosses over first touch-sensing signal lines other than the corresponding first touch-sensing signal line.

Optionally, any via of the plurality of first vias 50 in regions R4 where the respective one of the plurality of first touch-sensing electrodes 10 crosses over first touch-sensing signal lines other than the corresponding first touch-sensing signal line is a blind via 503.

Optionally, a total number of vias of the plurality of first vias 50 in each of the plurality of cross-over regions CR is substantially same.

Optionally, the through-hole via 500 extends through the first insulating layer 70 and exposes a partial surface of the respective one of the plurality of first touch-sensing signal lines 30. Optionally, the blind via 503 partially extends into the first insulating layer 70 without exposing a surface of the respective one of the plurality of first touch-sensing signal lines 30.

Figure 6A:
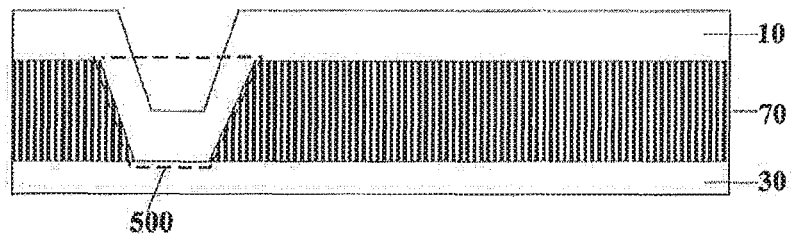
FIG. 6A is a schematic diagram of a structure of a through-hole via in some embodiments according to the present disclosure.

FIG. 6A is a schematic diagram of a structure of a through-hole via in some embodiments according to the present disclosure. FIG. 6A shows that a respective one of the plurality of first touch-sensing signal line is electrically connected to a corresponding first touch-sensing electrode in some embodiments according to the present disclosure.

Referring to FIG. 6A and FIG. 5B, in some embodiments, the respective one of the plurality of first touch-sensing signal lines 30 is electrically connected to the corresponding first touch-sensing electrode through the through-hole via 500 extending through the thickness of the first insulating layer 70. In one example, the respective one of the plurality of first touch-sensing signal lines 30 is directly connected to the corresponding first touch-sensing electrode. In another example, the respective one of the plurality of first touch-sensing signal lines 30 is electrically connected to the corresponding first touch-sensing electrode through an auxiliary structure.

Referring to FIG. 6A and FIG. 5C, in some embodiments, the respective one of the plurality of first touch-sensing electrodes 10 is electrically connected to the corresponding first touch-sensing signal line through the through-hole via 500 extending through the thickness of the first insulating layer 70. In one example, the respective one of the plurality of first touch-sensing electrodes 10 is directly connected to the corresponding first touch-sensing signal line. In another example, the respective one of the plurality of first touch-sensing electrodes 10 is electrically connected to the corresponding first touch-sensing signal line through an auxiliary structure.

Figure 6B:
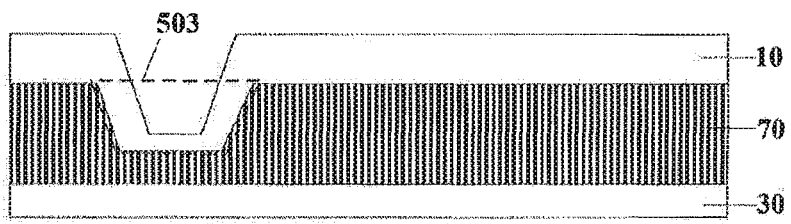
FIG. 6B is a schematic diagram of a structure of a blind in some embodiments according to the present disclosure.

FIG. 6B is a schematic diagram of a structure of a blind in some embodiments according to the present disclosure. FIG. 6B shows that a respective one of a plurality of first touch-sensing signal lines is on a side of a respective one of a plurality of first touch-sensing electrodes, but is insulated from the respective one of the plurality of first touch-sensing electrodes in some embodiments according to the present disclosure.

Referring to FIG. 6B and FIG. 5B, in some embodiments, along the first direction D1, at least one blind via 503 is in regions R2 where the respective one of the plurality of first touch-sensing signal lines 30 crosses over first touch-sensing electrodes other than the corresponding first touch-sensing electrode. The respective one of the plurality of first touch-sensing signal lines 30 is insulated from the first touch-sensing electrodes other than the corresponding first touch-sensing electrode in regions R2 corresponding to the at least one blind via 503. The at least one blind via 503 does not function as a vias allowing an electrical connection between the respective one of the plurality of first touch-sensing signal lines 30 and the first touch-sensing electrodes other than the corresponding first touch-sensing electrode, so along the first direction D1, the respective one of the plurality of first touch-sensing signal lines 30 is insulated from the first touch-sensing electrodes other than the corresponding first touch-sensing electrode, and no short occurs between the respective one of the plurality of first touch-sensing signal lines 30 and the first touch-sensing electrodes other than the corresponding first touch-sensing electrode.

Referring to FIG. 6B and FIG. 5C, in some embodiments, along the second direction D2, at least one blind via 503 is in regions R4 where the respective one of the plurality of first touch-sensing electrodes 10 crosses over first touch-sensing signal lines other than the corresponding first touch-sensing signal line. The respective one of the plurality of first touch-sensing electrodes 10 is insulated from the first touch-sensing signal lines other than the corresponding first touch-sensing signal line in regions R4 corresponding to the at least one blind via 503. The at least one blind via 503 does not function as a via allowing an electrical connection between the respective one of the plurality of first touch-sensing electrodes 10 and first touch-sensing signal lines other than the corresponding first touch-sensing signal line, so along the second direction D2, the respective one of the plurality of first touch-sensing electrodes 10 is insulated from first touch-sensing signal lines other than the corresponding first touch-sensing signal line, and no short occurs between the respective one of the plurality of first touch-sensing electrodes 10 and first touch-sensing signal lines other than the corresponding first touch-sensing signal line.

Referring to FIG. 6A and FIG. 6B, optionally, the first insulating layer 70 is a singular layer. Optionally, the first insulating layer 70 includes multiple sub-layers.

Referring to FIG. 3B, in one example, the respective one of the plurality first touch-sensing electrodes 10 is electrically connected to the corresponding first signal line through one through-hole via. Referring to FIG. 2 and FIG. 3A, the respective one of the plurality first touch-sensing electrodes 10 is electrically connected to the corresponding first signal line through multiple through-hole vias, the multiple through-hole vias can increase a contacting area between the respective one of the plurality first touch-sensing electrodes 10 and the corresponding first signal line, and ensure the validity of the electrical connection between the respective one of the plurality first touch-sensing electrodes 10 and the corresponding first signal line.

In some embodiments, referring to FIG. 2 to FIG. 4, the touch-sensing display substrate includes the plurality of first touch-sensing electrodes 10 and the plurality of first touch-sensing signal lines 30. Optionally, the plurality of first touch-sensing signal lines 30 cross over the plurality of first touch-sensing electrodes 10 along a cross-over direction D3. For example, the first direction D1 and the cross-over direction D3 are the same. Only the region where the respective one of the plurality of first touch-sensing signal lines 30 crosses over the corresponding first touch-sensing electrode has through-hole vias extending through the thickness of the first insulating layer 70, the respective one of the plurality of first touch-sensing signal lines 30 and the corresponding first touch-sensing electrode are electrically connected to each other through the through-hole via 500. Along the cross-over direction D3, the regions where the respective one of the plurality of first touch-sensing signal lines 30 crosses over the plurality of first touch-sensing electrodes other than the corresponding first touch-sensing electrode are absent of any through-hole via and has at least one blind vias 503.

In some embodiments, the plurality of the first vias 50 are arranged in array and evenly distributed throughout the touch-sensing display substrate.

In some embodiments, along the cross-over direction D3, there area plurality of first vias 50 in regions where the respective one of the plurality of first touch-sensing signal lines 30 crosses over the plurality of the first touch-sensing electrodes 10, and the plurality of first vias 50 includes a through-hole via and a blind via. The plurality of first vias 50 is evenly distributed along the cross-over direction D3. Adding the blind via solves the problem that the through-hole via cannot be evenly distributed along the cross-over direction D3, and cannot be evenly distributed throughout the touch-sensing display substrate, and problems of display defects along an oblique line on the display substrate, and problems of display nonuniformity are solved.

Figure 7:
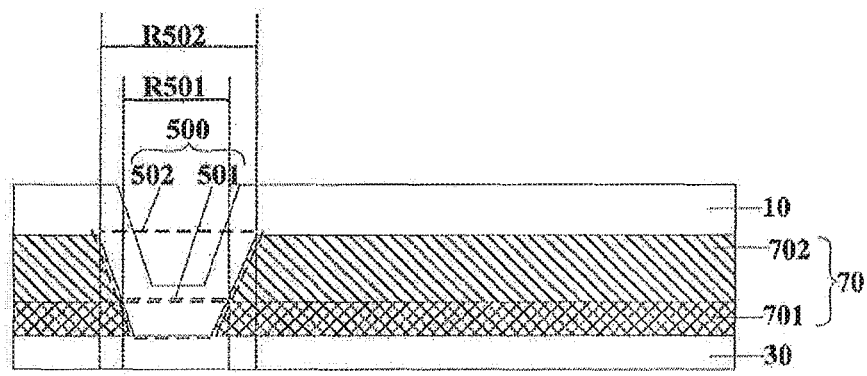
FIG. 7 is a schematic diagram of a structure of a through-hole via in some embodiments according to the present disclosure.
Figure 8A:
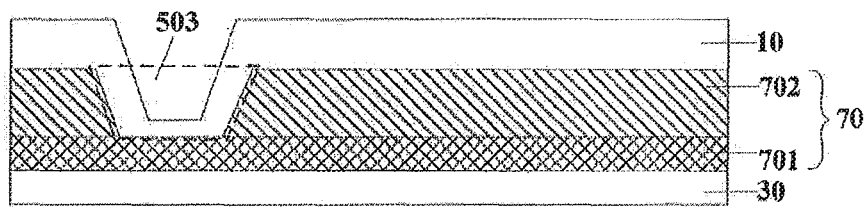
FIG. 8A is a schematic diagram of a structure of a blind via in some embodiments according to the present disclosure.
Figure 8B:
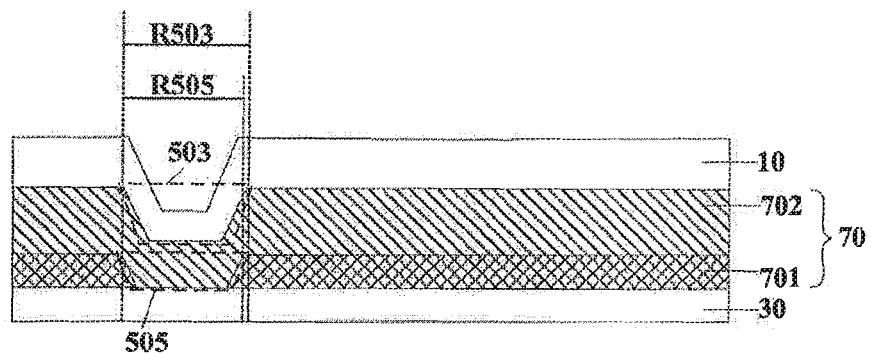
FIG. 8B is a schematic diagram of a blind via in some embodiments according to the present disclosure.

FIG. 7 is a schematic diagram of a structure of a through-hole via in some embodiments according to the present disclosure. FIG. 7 shows that a respective one of the plurality of first touch-sensing signal line is electrically connected to a corresponding first touch-sensing electrode in some embodiments according to the present disclosure. FIG. 8A is a schematic diagram of a structure of a blind via in some embodiments according to the present disclosure. FIG. 8A shows that a respective one of a plurality of first touch-sensing signal lines is on a side of a respective one of a plurality of first touch-sensing electrodes, but is insulated from the respective one of the plurality of first touch-sensing electrodes in some embodiments according to the present disclosure. FIG. 8B is a schematic diagram of a blind via in some embodiments according to the present disclosure. FIG. 8B shows that a respective one of a plurality of first touch-sensing signal lines is on a side of a respective one of a plurality of first touch-sensing electrodes, but is insulated from the respective one of the plurality of first touch-sensing electrodes in some embodiments according to the present disclosure. Referring to FIG. 7 to FIG. 8B, in some embodiments, the first insulating layer 70 includes a first insulating sub-layer 701 and a second insulating sub-layer 702. Optionally, the first insulating sub-layer 701 is on the plurality of first touch-sensing signal lines 30. Optionally, the second insulating sub-layer 702 is on a side of the first insulating sub-layer 701 away from the plurality of first touch-sensing signal lines 30.

Referring to FIG. 7, in some embodiments, the through-hole via 500 includes a first sub-via 501 extending through the first insulating sub-layer 701, and a second sub-via 502 extending through the second insulating sub-layer 702. Optionally, the first sub-via 501 is connected with the second sub-via 502, allowing the respective one of the plurality of first touch-sensing signal lines 30 to be electrically connected to the corresponding first touch-sensing electrode through the first sub-via 501 and the second sub-via 502. Optionally, a region R501 corresponding to the first sub-via 501 partially overlaps with a region corresponding to the second sub-via 502.

Referring to FIG. 8A, in some embodiments, the blind via 503 extends into at least the second insulating sub-layer 702 but does not extend through the first insulating sub-layer 701. For example, prior to forming the blind via 503, the first insulating sub-layer 701 and the second insulating sub-layer 702 are formed. And the blind via 503 is formed to extend into the second insulating sub-layer 702. Optionally, the blind via 503 is formed to extend through the second insulating sub-layer 702 and extend into the first insulating sub-layer 701, but not extend through the first insulating sub-layer 701.

Referring to FIG. 8B, in some embodiments, a third sub-via 505 extends through the first insulating sub-layer 701. Optionally, the second insulating sub-layer 702 extends into the third sub-via 505. Optionally, the blind via 503 partially extends into the second insulating sub-layer 702 without exposing a portion of a surface of the respective one of the plurality of first touch-sensing signal lines 30. For example, the first insulating sub-layer 701 is formed. Subsequently, the third sub-via 505 is formed to extend into the first insulating sub-layer 701. Subsequently, the second insulating sub-layer 702 is formed to extend into the third sub-via 505. Optionally, the second insulating sub-layer 702 is formed to have a curved-shape following a shape of the third sub-via 505, thereby forming the blind via 503. Optionally, the blind via 503 is formed to extend into the second insulating sub-layer 702. Optionally, a region R503 corresponding to the blind via 503 at least partially overlaps with a region R505 corresponding to the third sub-via 505.

Optionally, the first insulating sub-layer 701 and the second insulating sub-layer 702 includes a same material. For example, the first insulating sub-layer 701 and the second insulating sub-layer 702 is formed using the same material, in the process of forming a via on the second insulating sub-layer 702, the second insulating sub-layer 702 may be over-etched, which allows the via to extend into the first insulating sub-layer 701.

Optionally, the first insulating sub-layer 701 and the second insulating sub-layer 702 includes different materials.

For example, in the process of forming a via on the second insulating sub-layer 702, because the first insulating sub-layer 701 is formed using a material different from a materials used to form the second insulating sub-layer 702, the via on the second insulating sub-layer 702 can be prevented from extending into the first insulating sub-layer 701.

Various appropriate materials and various appropriate fabricating methods may be used to make the first insulating sub-layer and the second insulating sub-layer. Example of material suitable for making the first insulating sub-layer and the second insulating sub-layer includes organic materials and inorganic materials.

Referring to FIG. 6A and FIG. 7, in some embodiments, the respective one of the plurality of first touch-sensing electrodes 10 extends into a corresponding through-hole via. So, the respective one of the plurality of first touch-sensing electrodes 10 is electrically connected to the corresponding first touch-sensing signal lines 30 through the corresponding through-hole via.

Referring to FIG. 2, FIG. 3A, and FIG. 3B, in some embodiments, the respective one of the plurality of first touch-sensing signal lines 30 crosses over the plurality of first touch-sensing electrodes 10 along the cross-over direction D3. Optionally, a column of multiple first vias along the cross-over direction D3 of the plurality of first vias 50 are evenly distributed. Optionally, the multiple first vias along the cross-over direction D3 of the plurality of first vias 50 includes the through-hole via 500 and the blind via 503.

In order to allow the plurality of first vias 50 to be evenly distributed along the cross-over direction D3, the plurality of first vias 50 can be arranged following the arrangements shown in FIG. 2, FIG. 3A, and FIG. 3B. For example, along the cross-over direction D3, the plurality of first vias including the through-hole via 500 and the blind via 503 are evenly distributed, which can improve the display uniformity of the display apparatus having the touch-sensing display substrate described herein.

Figure 9A:
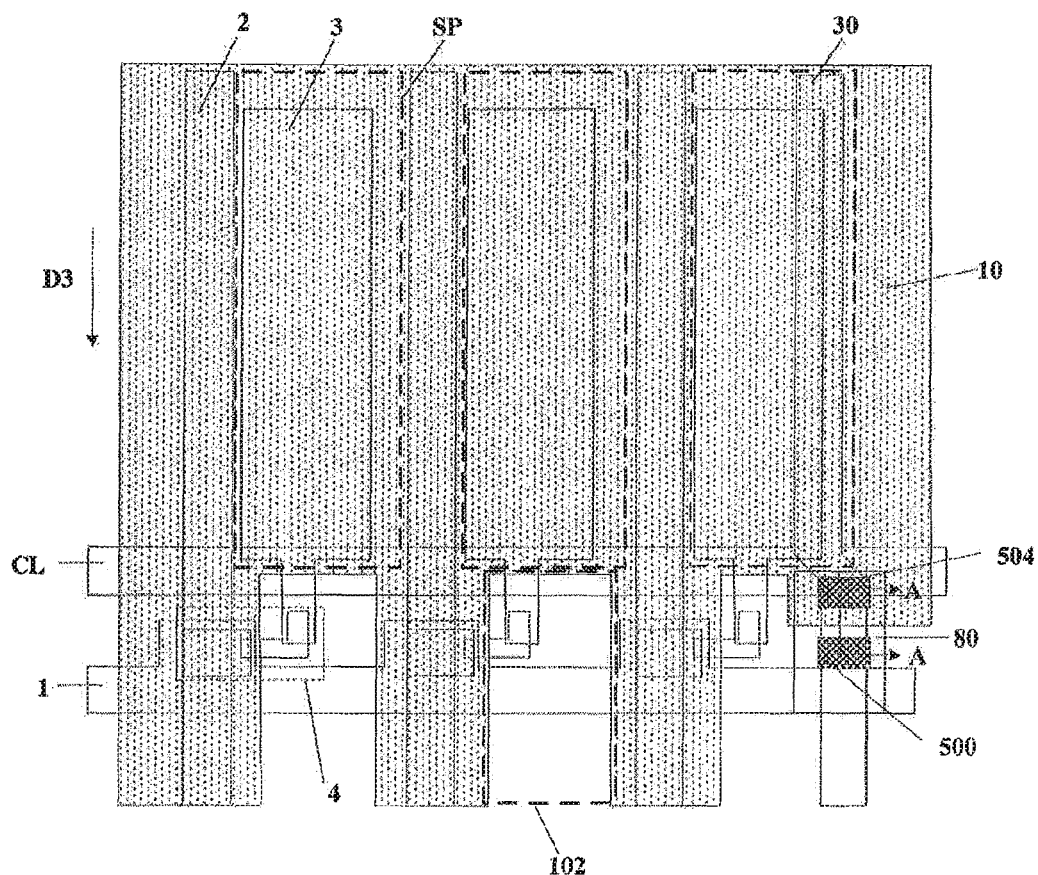
FIG. 9A is a schematic diagram illustrating that a respective one of the plurality of first touch-sensing signal lines is electrically connected to a corresponding touch-sensing electrode in some embodiments according to the present disclosure.
Figure 9B:
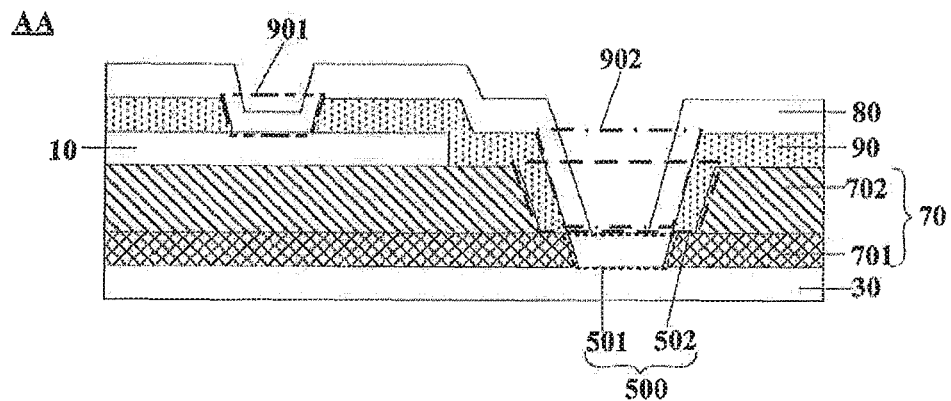
FIG. 9B is a cross-sectional view of a touch-sensing display substrate in FIG. 9A along an AA line.
Figure 9C:
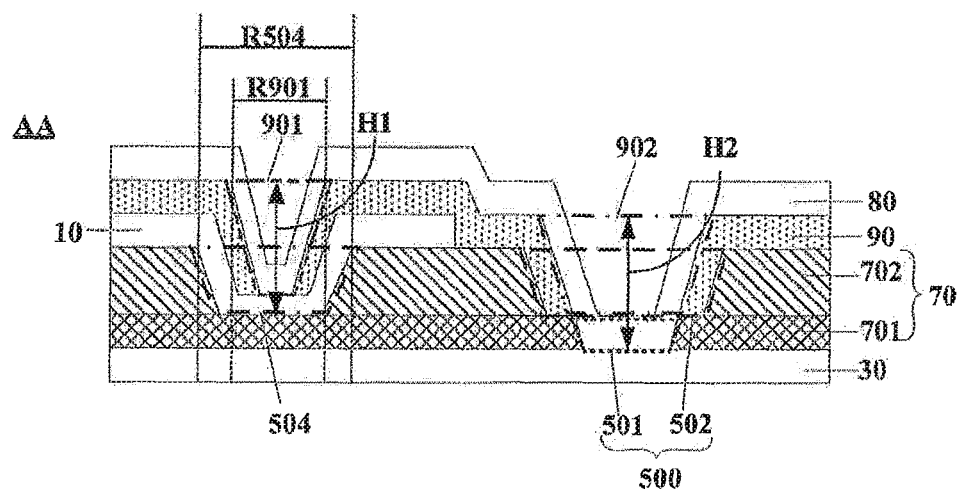
FIG. 9C is a cross-sectional view of a touch-sensing display substrate in FIG. 9A along an AA line.

FIG. 9A is a schematic diagram illustrating that a respective one of the plurality of first touch-sensing signal lines is electrically connected to a corresponding touch-sensing electrode in some embodiments according to the present disclosure. FIG. 9B is a cross-sectional view of a touch-sensing display substrate in FIG. 9A along an AA line. FIG. 9C is a cross-sectional view of a touch-sensing display substrate in FIG. 9A along an AA line.

Referring to FIG. 9A, in some embodiments, a region corresponding to the through-hole via 500 is not overlapping with the plurality of first touch-sensing electrodes 10.

In some embodiments, referring to FIG. 9A, FIG. 9B, and FIG. 9C, the touch-sensing display substrate further includes a plurality of auxiliary electrodes 80 respectively connecting the plurality of first touch-sensing electrodes 10 with the plurality of first touch-sensing signal lines 30, and a second insulating layer 90 between the plurality of auxiliary electrodes 80 and a structure including the plurality of first touch-sensing electrodes 10 and the plurality of first touch-sensing signal lines 30. Optionally, referring to FIG. 9B and FIG. 9C, the plurality of auxiliary electrodes 80 is on a side of the plurality of first touch-sensing electrodes 10 away from the plurality of first touch-sensing signal lines 30. Optionally, the second insulating layer 90 is between the plurality of auxiliary electrodes 80 and the plurality of first touch-sensing electrodes 10.

In some embodiments, referring to FIG. 9B, the touch-sensing display substrate further includes the plurality of second vias 901 respective extending through the second insulating layer 90. Optionally, a respective one of the plurality of auxiliary electrodes 80 is electrically connected to the respective one of the plurality of first touch-sensing electrodes 10 through a respective one of the plurality of second vias 901.

In some embodiments, the touch-sensing display substrate further includes a plurality of third vias 902 (as shown in the region encircled by loosely dash-dotted lines) respective extending through the second insulating layer 90. Optionally, a respective one of the plurality of auxiliary electrodes 80 extends through a respective one of the plurality of third vias 902. Optionally, the respective one of the plurality of third vias 902 is connected with the respective one of the plurality of first vias 50. Optionally, in a region corresponding to the through-hole via 500, the respective one of the plurality of third vias 902 is connected with the through-hole via 500. Optionally, the respective one of the plurality of auxiliary electrodes 80 is electrically connected to the respective one of the plurality of first touch-sensing signal lines 30 through the respective one of the plurality of third vias 902 and the through-hole via 500.

In some embodiments, referring to FIG. 9A, the plurality of gate lines 1 and the plurality of data lines 2 defines a plurality of subpixel regions SP. In some embodiments, the touch-sensing display substrate further includes a plurality of thin film transistors 4 respectively in a plurality of subpixel regions. Optionally, a drain electrode of a respective one of the plurality of thin film transistors 4 is electrically connected to a respective one of the plurality of pixel electrodes. Optionally, the plurality of auxiliary electrodes 80 and a plurality of pixel electrodes 3 are in a same layer and include a same material.

Optionally a respective one of the plurality of data lines 2 is electrically connected to a source electrode of the respective one of the plurality of thin film transistors 4. Optionally, a respective one of the plurality of thin film transistors includes an active layer, a gate electrode, and a gate insulating layer.

As used herein, a subpixel region refers to a light emission region of a subpixel, such as a region corresponding to a pixel electrode in a liquid crystal display, a region corresponding to a light emissive layer in an organic light emitting diode display panel, or a region corresponding to the light transmission layer in the present disclosure. Optionally, a pixel may include a number of separate light emission regions corresponding to a number of subpixels in the pixel. Optionally, the subpixel region is a light emission region of a red color subpixel. Optionally, the subpixel region is a light emission region of a green color subpixel. Optionally, the subpixel region is a light emission region of a blue color subpixel. Optionally, the subpixel region is a light emission region of a white color subpixel.

Referring to FIG. 9A, the respective one of the plurality of first touch-sensing signal lines 30 crosses over the corresponding first touch-sensing electrode 10.

In some embodiments, referring to FIG. 9A and FIG. 9B, when the touch-sensing display substrate includes the plurality of thin film transistors 4, the first insulating sub-layer 701 and the gate electrodes of the plurality of thin film transistors 4 are in a same layer and include a same material. Optionally, the second insulating sub-layer 702 and a planarization layer on the plurality of thin film transistors 4 are in a same layer and include a same materials, so that the second insulating sub-layer 702 and the planarization layer can be formed at the same time.

In some embodiments, because the respective one of the plurality of auxiliary electrodes 80 is electrically connected to the respective one of the plurality of first touch-sensing electrodes 10 through the respective one of the plurality of second vias 901, and the respective one of the plurality of auxiliary electrodes 80 is electrically connected to the respective one of the plurality of first touch-sensing signal lines 30 through the respective one of the plurality of third vias 902 and the through-hole via 500, the respective one of the plurality of auxiliary electrodes 80 is electrically connected to both the respective one of the plurality of first touch-sensing electrodes 10 and the respective one of the plurality of first touch-sensing signal lines 30, so, the respective one of the plurality of first touch-sensing electrodes 10 and the respective one of the plurality of first touch-sensing signal lines 30 are electrically connected to each other through the respective one of the plurality of auxiliary electrodes 80.

In some embodiments, referring to FIG. 9C, the touch-sensing display substrate further includes a second blind via 504 (as shown in the region encircled by dash-dash-dotted lines) partially extending into the first insulating layer 70. Optionally, the respective one of the plurality of auxiliary electrodes 80 at least partially extends into the second blind via 504. Optionally, the region corresponding to the blind via 503 and the region corresponding to the second blind via 504 are non-overlapping. Optionally, the second blind via 504 is in the region where the respective one of the plurality of first touch-sensing signal lines 30 crosses over the corresponding first touch-sensing electrode 10.

In one example, when the first insulating layer 70 includes the first insulating sub-layer 701 and the second insulating sub-layer 702, the second blind via 504 extends through the second insulating sub-layer 702. For example, a region R504 corresponding to the second blind via 504 at least partially overlaps with a region R901 corresponding to the respective one of the plurality of second vias 901.

Figure 9D:
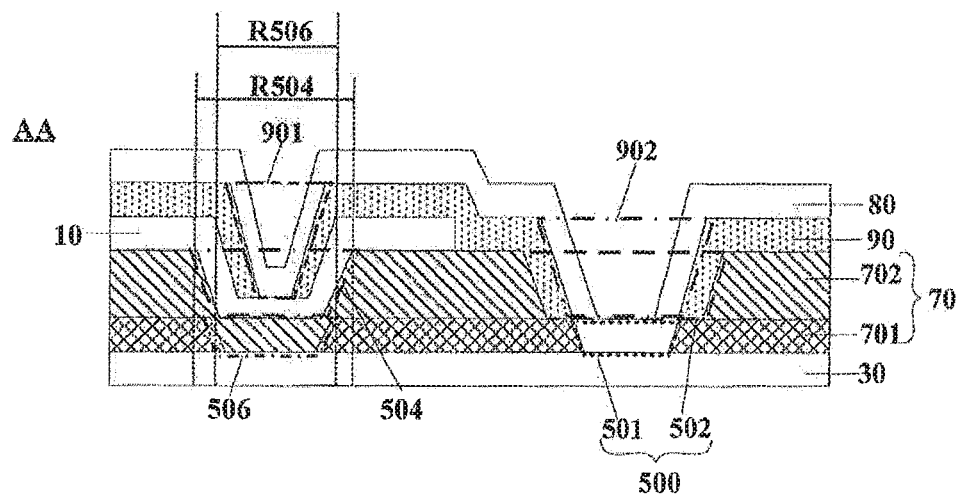
FIG. 9D is a cross-sectional view of a touch-sensing display substrate in FIG. 9A along an AA line.

FIG. 9D is a cross-sectional view of a touch-sensing display substrate in FIG. 9A along an AA line. Referring to FIG. 9D, in another example, a fourth sub-via 506 (as shown in the region encircled by densely dash-dotted lines) extends through the first insulating sub-layer 701. So, the second insulating sub-layer 702 extends into the fourth sub-via 506. Optionally, the second blind via 504 partially extends into the second insulating sub-layer 702 without exposing a portion of a surface of the respective one of the plurality of first touch-sensing signal lines 30. For example, the first insulating sub-layer 701 is formed. Subsequently, the fourth sub-via 506 is formed to extend into the first insulating sub-layer 701. Subsequently, the second insulating sub-layer 702 is formed to extend into the fourth sub-via 506. Optionally, the second insulating sub-layer 702 is formed to have a curved-shape following a shape of the fourth sub-via, thereby forming the second blind via 504. Optionally, the second blind via 504 is formed to extend into the second insulating sub-layer 702. Optionally, the region R504 corresponding to the second blind via 504 at least partially overlaps with a region R506 corresponding to the fourth sub-via 506.

In some embodiments, referring to FIG. 9C, the second blind via 504 partially extends into the first insulating layer 70, and the region R504 corresponding to the second blind via 504 partially overlaps with the regions R901 corresponding to the respective one of the plurality of second vias 901, e.g., the second blind via 504 connects to the respective one of the plurality of second vias 901, so, a depth H1 from a top of the respective one of the plurality of second vias 901 to a bottom of the second blind via 504 and a depth H2 from a top of the respective one of the plurality of third vias 902 to a bottom of the through-hole via 500 are substantially the same.

As used herein, the term "substantially the same" refers to a difference between two values not exceeding 10% of a base value (e.g., one of the two values), e.g., not exceeding 8%, not exceeding 6%, not exceeding 4%, not exceeding 2%, not exceeding 1%, not exceeding 0.5%, not exceeding 0.1%, not exceeding 0.05%, and not exceeding 0.01%, of the base value.

In some embodiments, the first insulating layer 70 and the second insulating layer 90 includes a same material. Optionally, the first insulating layer 70 and the second insulating layer 90 includes different materials. Optionally, when the first insulating layer 70 includes the first insulating sub-layer 701 and the second insulating sub-layer 702, the first insulating sub-layer 701 and the second insulating layer 90 include an inorganic material, and the second insulating sub-layer 702 includes an organic material.

Since the first insulating sub-layer 701 and the second insulating layer 90 include the inorganic material, the first sub-via 501 extending into the first insulating sub-layer 701, the respective one of the plurality of second vias 901 extending into the second insulating layer 90, and the respective one of the plurality of third vias 902 can be formed in a same process.

For example, referring to FIG. 9B and FIG. 9C, the respective one of the plurality of second vias 901 (as shown in the region encircled by long-dash-short-dash-short-dash lines) extends through the second insulating layer 90, and the respective one of the plurality of second vias 901 is blocked by the respective one of the first touch-sensing electrode 10 and cannot extend into the first insulating sub-layer 701. Because the plurality of second vias 901 are not in the region corresponding to the through-hole via 500, when the respective one of the plurality of third vias 902 (as shown in the region encircled by loosely dash-dotted lines) is formed to extend through the second insulating layer 90 using etching process, the first insulating sub-layer 701 is also etched to form the first sub-via 501 extending through the first insulating sub-layer 701. So, the same etch process can be used to form both the respective one of the plurality of second vias 901, the respective one of the plurality of third vias 902, and the first sub-via 501 (as shown in the region encircled by densely dashed lines). Also, the second sub-via 502 (as shown in the region encircled by loosely dashed lines) can be formed using another etching process. In all, referring to FIG. 9B and FIG. 9C, the respective one of the plurality of second vias 901, the respective one of the plurality of third vias 902, the first sub-via 501, and the second sub-via 502 can be formed using two etching processes, which can simplify the process of fabricating the touch-sensing display substrate described herein. Moreover, referring to FIG. 9B, when the second blind via 504 extends through the second insulating sub-layer 702, the second blind via 504 and the second sub-via 502 can be formed in the same process.

In some embodiments, referring to FIG. 9A to FIG. 9D, the respective one of the plurality of first touch-sensing signal lines 30 is electrically connected to the respective one of the plurality of first touch-sensing electrodes 10 using the respective one of the plurality of auxiliary electrodes 80 extending into the respective one of the plurality of third vias 902, the through-hole via 500, and the respective one of the plurality of second vias 901. Optionally, the respective one of the plurality of first touch-sensing signal lines 30 is electrically connected to the respective one of the plurality of first touch-sensing electrodes 10 using the respective one of the plurality of auxiliary electrodes 80 extending into the respective one of the plurality of third vias 902, the through-hole via 500, and the respective one of the plurality of second vias 901, and the second blind via 504.

Figure 10:
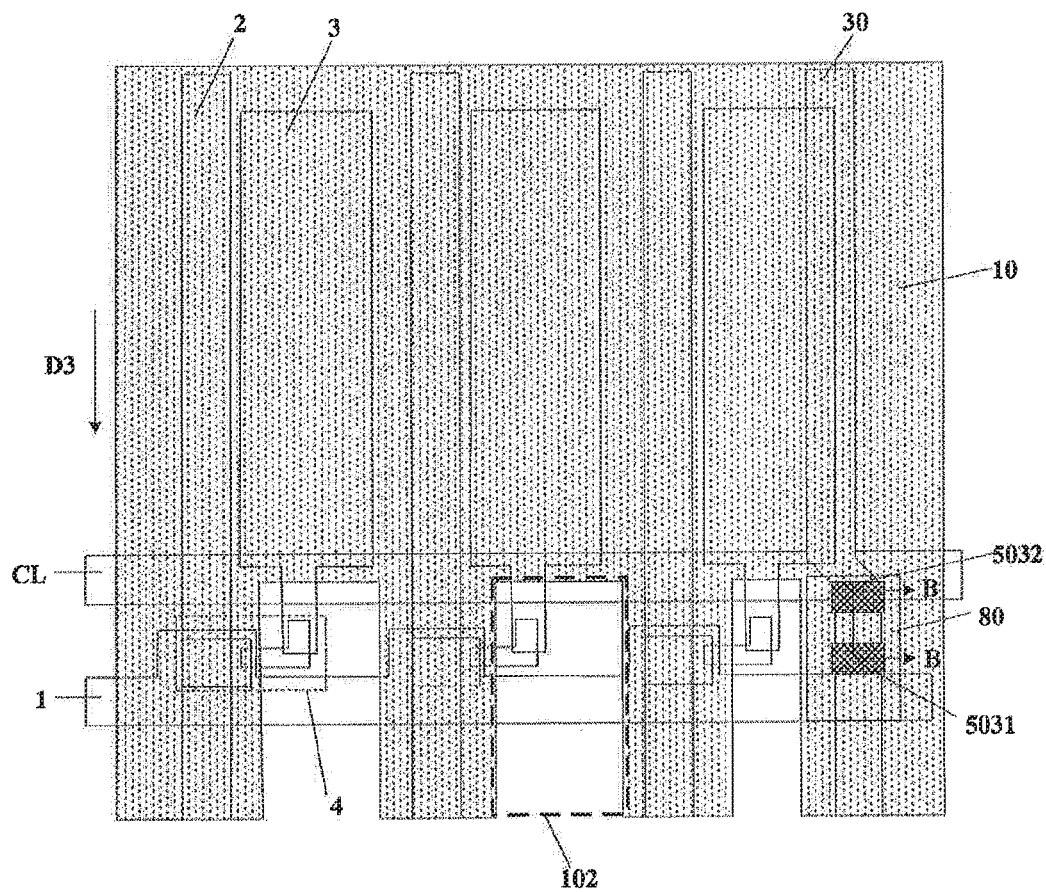
FIG. 10 is a schematic diagram illustrating that a respective one of a plurality of first touch-sensing signal lines is on a side of a corresponding first touch-sensing electrode, but is insulated from the corresponding first touch-sensing electrode in some embodiments according to the present disclosure.
Figure 11A:
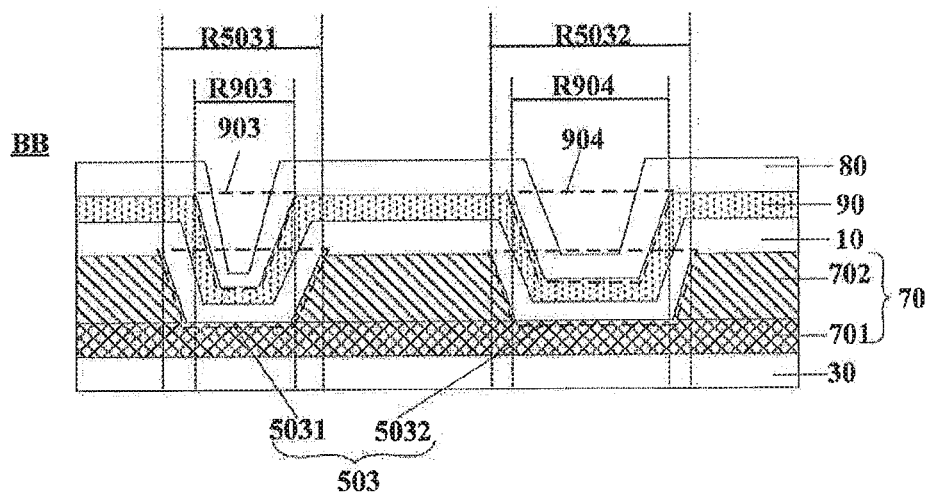
FIG. 11A is a cross-sectional view of a touch-sensing display substrate in FIG. 10 along a BB line.
Figure 11B:
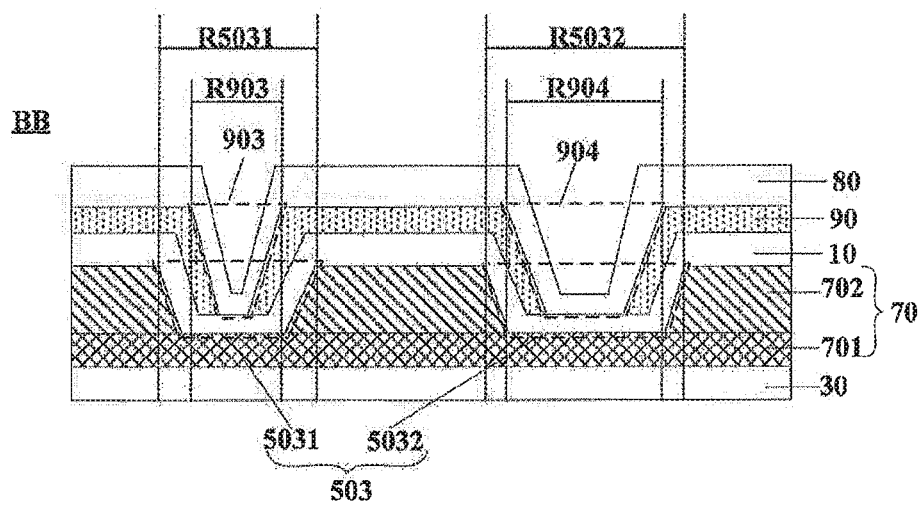
FIG. 11B is a cross-sectional view of a touch-sensing display substrate in FIG. 10 along a BB line.
Figure 12A:
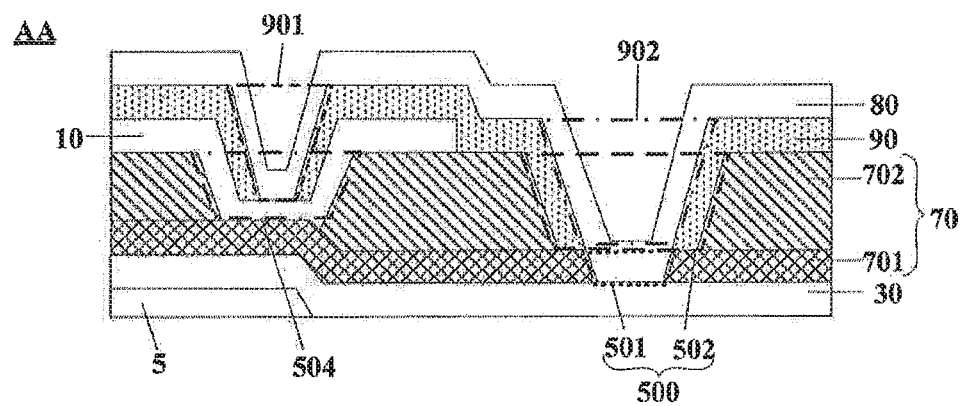
FIG. 12A is a cross-sectional view of a touch-sensing display substrate in FIG. 9A along an AA line.
Figure 12B:
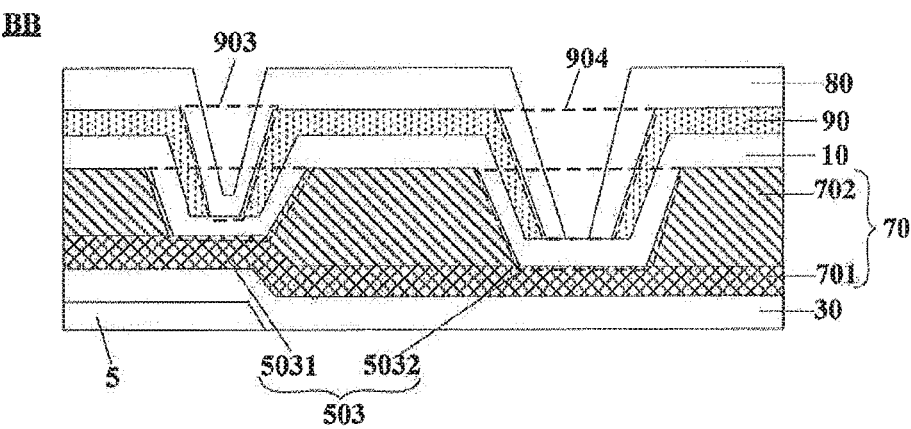
FIG. 12B is a cross-sectional view of a touch-sensing display substrate in FIG. 10 along a BB line.

FIG. 10 is a schematic diagram illustrating that a respective one of a plurality of first touch-sensing signal lines is on a side of a corresponding first touch-sensing electrode, but is insulated from the corresponding first touch-sensing electrode in some embodiments according to the present disclosure. FIG. 11A is a cross-sectional view of a touch-sensing display substrate in FIG. 10 along a BB line. FIG. 11B is a cross-sectional view of a touch-sensing display substrate in FIG. 10 along a BB line. FIG. 12A is a cross-sectional view of a touch-sensing display substrate in FIG. 9A along an AA line. FIG. 12B is a cross-sectional view of a touch-sensing display substrate in FIG. 10 along a BB line.

Referring to FIG. 10, an orthographic projection of the respective one of the plurality of first touch-sensing signal lines 30 at least partially overlaps with an orthographic projection of one of the plurality of first touch-sensing electrodes 10 other than the corresponding first touch-sensing electrodes. The respective one of the plurality of first touch-sensing signal lines 30 is insulated from the plurality of first touch-sensing electrodes 10 other than the corresponding first touch-sensing electrodes.

In some embodiments, referring to FIG. 1A and FIG. 11B, along the cross-over direction D3 of the plurality of first touch-sensing signal lines 30, in order for vias between the respective one of the plurality first touch-sensing signal line 30 and the corresponding first touch-sensing electrode 10 are evenly distributed along the cross-over direction D3, the blind via 503 further includes a first blind sub-via 5031, and a second blind sub-via 5032. A region R5031 corresponding to the first blind sub-via 5031 and a region R5032 corresponding to the second blind sub-via 5032 are not overlapping with each other. Optionally, the first blind sub-via 5031 is at least partially extend into the second insulating sub-layer 702. Optionally, the second blind sub-via 5032 is at least partially extend into the second insulating sub-layer 702. Optionally, the first blind sub-via 5031 and the second blind sub-via 5032 is in the region where the respective one of the plurality of first touch-sensing signal lines 30 cross over the plurality of first touch-sensing electrodes other than the corresponding first touch-sensing electrode.

In some embodiments, referring to FIG. 11A and FIG. 11B, in a region corresponding to the blind via 503, the touch-sensing display substrate further includes a plurality of fourth vias 903 and a plurality of fifth vias 904 at least partially extending into the second insulating layer 90. Optionally, the blind via 503 includes the first blind sub-via 5031 and the second blind sub-via 5032. Optionally, the respective one of the plurality of fourth vias 903 is connected with the first blind sub-via 5031. Optionally, the respective one of the plurality of fifth vias 904 is connected with the second blind sub-via 5032.

Referring to FIG. 11B, the touch-sensing display substrate further includes a plurality of fourth vias 903 at least partially extending into the second insulating layer 90, and a plurality of fifth vias 904 at least partially extending into the second insulating layer 90. Optionally, the respective one of the plurality of auxiliary electrodes 80 is electrically connected to the respective one of the plurality of first touch-sensing electrodes 10 by extending into the respective one of the plurality of fourth vias 903. Optionally, the respective one of the plurality of auxiliary electrodes 80 is electrically connected to the respected one of the plurality of first touch-sensing electrodes 10 by extending into the respective one of the plurality of fifth vias 904. Optionally, the respective one of the plurality of auxiliary electrodes 80 is electrically connected to the respective one of the plurality of first touch-sensing electrodes 10 through the respective one of the plurality of fourth vias 903 and the first blind sub-via 5031 and through the respective one of the plurality of fifth vias 904 and the second blind sub-via 5032.

Optionally, a region R903 corresponding to the respective one of the plurality of fourth vias 903 at least partially overlaps with a region R5031 corresponding to the first blind sub-via 5031. Optionally, a region R904 corresponding to the respective one of the plurality of fifth vias 904 at least partially overlaps with a region R5032 corresponding to the second blind sub-via 5032.

Because the respective one of the plurality of first touch-sensing electrodes 10 is in the region R903 corresponding to the respective one of the plurality of fourth vias 903 and the region R904 corresponding to the respective one of the plurality of fifth vias 904, when the second insulating layer 90 is etched to form the respective one of the plurality of fourth vias 903 and the respective one of the plurality of fifth vias 904, the respective one of the plurality of first touch-sensing electrodes 10 prevent the first insulating sub-layer 701 from being etched, so, the respective one of the plurality of auxiliary electrodes 80 will not be electrically connected to the plurality of the first touch-sensing signal lines 30 other than the corresponding first touch-sensing signal lines 30, and the respective one of the plurality of first touch-sensing signal lines 30 is insulated from the plurality of first touch-sensing electrodes 10 other than the corresponding first touch-sensing electrodes 10.

Referring to FIG. 3A, FIG. 3B, FIG. 9A and FIG. 10, in some embodiments, along the cross-over direction of the plurality of first touch-sensing signal lines 30, a respective one of the plurality of first touch-sensing signal lines 30 crosses over the plurality of first touch-sensing electrodes 10, two vias are formed in an crossing-over region where the respective one of the plurality of first touch-sensing signal lines 30 crosses over one of the plurality of first touch-sensing electrodes 10, which ensures that vias are evenly distributed along the cross-over direction and ensures the display uniformity of the display apparatus using the touch-sensing display substrate described herein.

In some embodiments, the plurality of auxiliary electrodes 80 and the plurality of pixel electrode 3 are in a same layer and includes a same materials, so, the plurality of auxiliary electrodes 80 and the plurality of pixel electrode 3 can be formed in a same process, which simplifies the process of fabricating the touch-sensing display substrate.

In some embodiments, referring to FIG. 3A and FIG. 3B, the touch-sensing display substrate includes the plurality of first apertures 101. Because a first portion of the plurality of gate lines 1 extends through at least one region corresponding to one of the plurality of first apertures 101, and a second portion of the plurality of gate lines 1 extends through regions without the plurality of first apertures 101, so, an area of one gate line of the first portion of the plurality of gate lines 1 electrically coupled with a corresponding touch-sensing electrode is different from an area of one gate line of the second portion of the plurality of gate lines 1 electrically coupled with a corresponding touch-sensing electrode. Moreover, an electrical coupling between the signal on one gate line of the first portion of the plurality of gate lines 1 and the corresponding touch-sensing electrode is different from an electrical coupling between the signal on one gate line of the second portion of the plurality of gate lines 1 and the corresponding touch-sensing electrode.

In some embodiments, because a first portion of the plurality of data lines 2 extends through at least one region corresponding to one of the plurality of first apertures 101, and a second portion of the plurality of data lines 2 extends through regions without the plurality of first apertures 101, so, an area of one gate line of the first portion of the plurality of data lines 2 electrically coupled with a corresponding touch-sensing electrode is different from an area of one gate line of the second portion of the plurality of data lines 2 electrically coupled with a corresponding touch-sensing electrode. Moreover, an electrical coupling between the signal on one gate line of the first portion of the plurality of data lines 2 and the corresponding touch-sensing electrode is different from an electrical coupling between the signal on one gate line of the second portion of the plurality of data lines 2 and the corresponding touch-sensing electrode.

In some embodiments, when the touch-sensing display substrate includes the plurality of first aperture 101 respectively extending through a thickness of the respective one of the plurality of first touch-sensing electrodes 10, the respective one of the plurality of second touch-sensing electrodes 20 includes the plurality of second touch-sensing sub-electrodes 201. One of the second touch-sensing sub-electrodes 201 of the respective one of the plurality of second touch-sensing electrodes 20 is in the region corresponding to one of the plurality of first apertures 101 corresponding to the respective one of the plurality of first touch-sensing electrodes 10. Referring to FIG. 9A and FIG. 10, the touch-sensing display substrate further includes a plurality of second apertures 102 respectively extend through the respective one of the plurality of first touch-sensing electrodes 10.

In some embodiments, the touch-sensing display substrate further includes a plurality of signal lines. Optionally, any signal line that crosses over multiple first apertures of the plurality of first apertures 101 in multiple first touch-sensing electrodes of the plurality of first touch-sensing electrodes 10 is absent in regions corresponding to the plurality of second apertures 102. Optionally, any signal line that crosses over multiple second apertures of the plurality of second apertures 102 in multiple first touch-sensing electrodes of the plurality of first touch-sensing electrodes 10 is absent in regions corresponding to the plurality of first apertures 101. Optionally, the respective one of the plurality of signal lines is selected from a group consisting of a gate line and a data line.

Optionally, multiple signal lines of the plurality of signal lines extending through regions corresponding to the plurality of first aperture 101. Optionally, multiple signal lines of the plurality of signal lines extending through regions corresponding to the plurality of second aperture 102. Optionally, no signal line is in regions without the plurality of first apertures 101 and the plurality of second apertures 102.

In some embodiments, the touch-sensing display substrate includes the plurality of first apertures 101 respectively extending through the thickness of the respective one of the plurality of first touch-sensing electrodes 10; and a plurality of second apertures 102 respectively extending through the respective one of the plurality of first touch-sensing electrodes 10. Optionally, multiple signal lines of the plurality of signal lines extending through regions corresponding to the plurality of first aperture 101. Optionally, multiple signal lines of the plurality of signal lines extending through regions corresponding to the plurality of second aperture 102. So, an electrical coupling between the signal on one of the multiple signal lines of the plurality of signal lines extending through regions corresponding to the plurality of first aperture 101 and the corresponding touch-sensing electrode and an electrical coupling between the signal on one of the multiple signal lines of the plurality of signal lines extending through regions corresponding to the plurality of second aperture 102 are substantially the same, which may solve the issue that a respective one of the plurality of first touch-sensing electrodes 10 has different electrically coupling with different signal lines.

Since the plurality of the first apertures 101 and the plurality of second apertures 102 extend through the respective one of the plurality of first touch-sensing electrodes 10, an area of the respective one of the plurality of first touch-sensing electrodes 10 decreases, and an electric resistance of the respective one of the plurality of first touch-sensing electrodes 10 increases. In order to solve the issue that the respective one of the plurality of first touch-sensing electrodes 10 increases, referring to FIG. 9A, FIG. 10, FIG. 12A, and FIG. 12B, the touch-sensing display substrate further includes a plurality of connecting lines CL respectively connected to the plurality of first touch-sensing signal lines 30. Optionally, the respective one of the plurality of first touch-sensing signal lines is between a respective one of the plurality of connecting lines CL and the respective one of the plurality of first touch-sensing electrodes 10. Optionally, the plurality of connecting lines CL are on a side of the plurality of first touch-sensing signal lines 30 away from the plurality of first touch-sensing electrodes 10. Optionally, a plurality of connecting lines CL are electrically connected to the plurality of first touch-sensing signal lines 30.

Optionally, the plurality of connecting lines CL and the plurality of gate lines 1 are in a same layer and include a same materials. So, the plurality of connecting lines CL and the plurality of gate line 1 can be formed in a same process. Optionally, the plurality of connecting lines CL and the plurality of data lines 2 are in a same layer and include a same material. So, the plurality of connecting lines CL and the plurality of data lines 2 can be formed in a same process.

In some embodiments, a corresponding first touch-sensing signal lines 30 electrically connected a respective one of the plurality of connecting lines CL and a respective one of the plurality of first touch-sensing electrodes 10, which can decrease the electrical resistance of the respective one of the plurality of first touch-sensing electrodes 10.

Figure 13A:
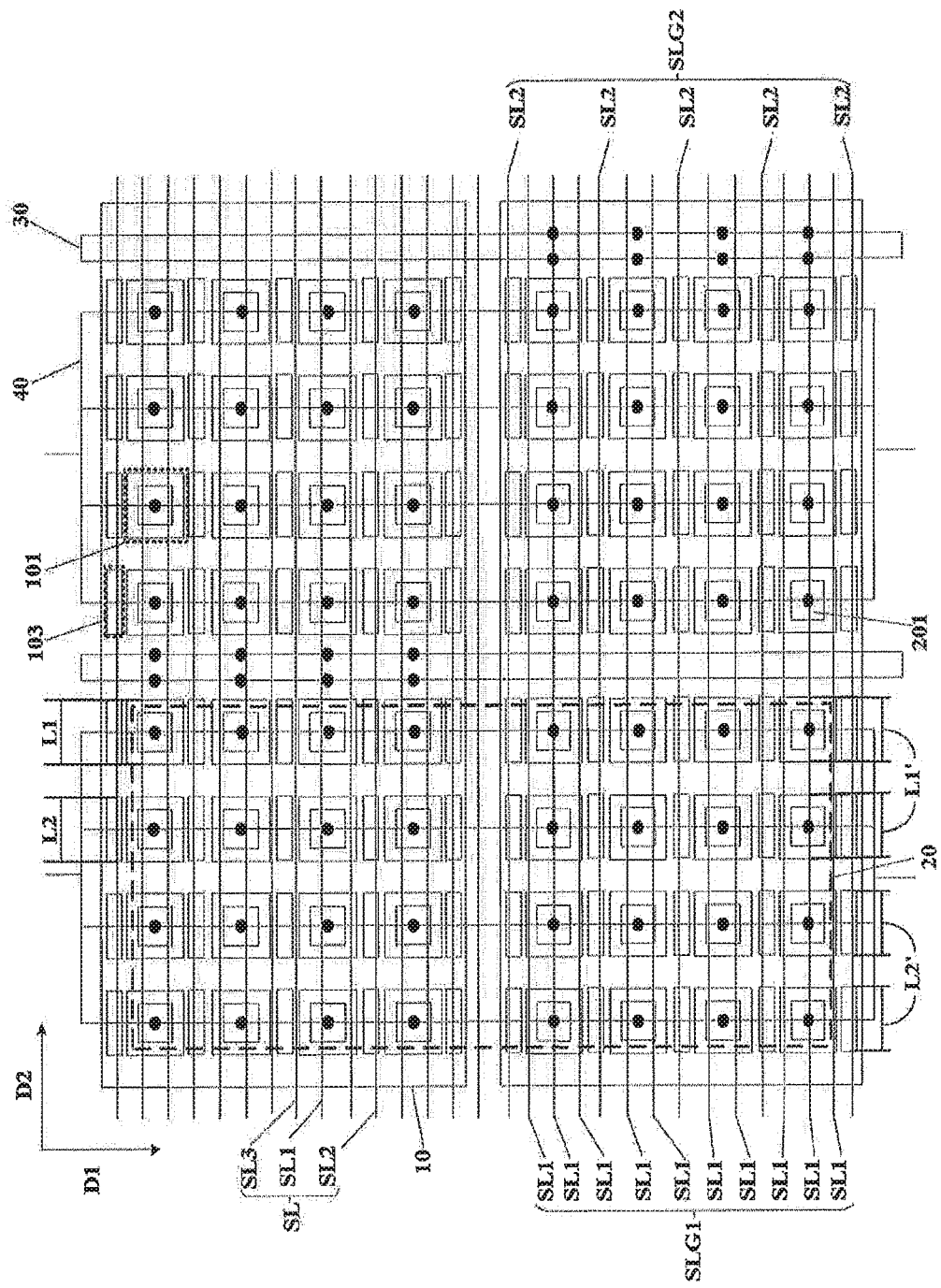
FIG. 13A is a schematic diagram of a structure of a touch-sensing display substrate in some embodiments according to the present disclosure.
Figure 13B:
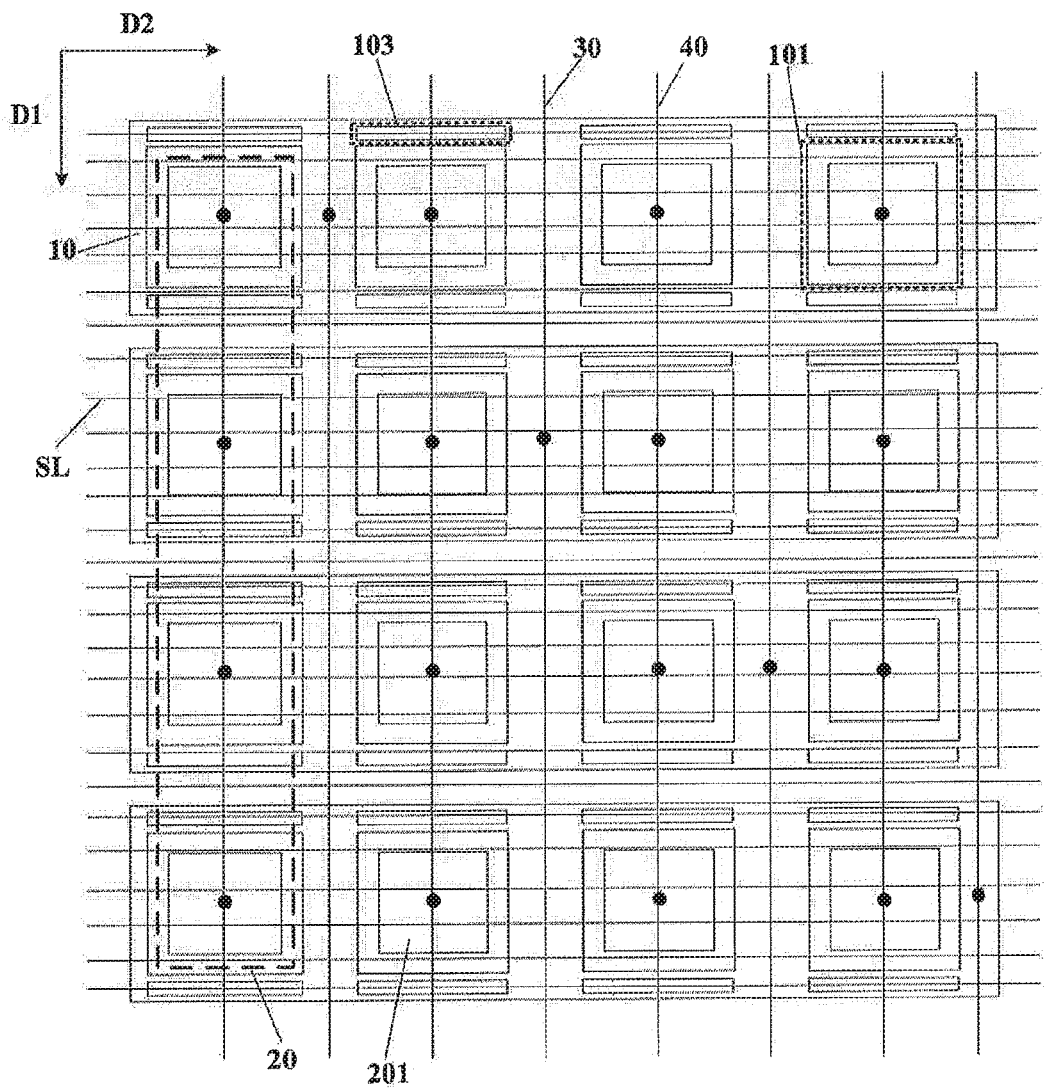
FIG. 13B is a schematic diagram of a structure of a touch-sensing display substrate in some embodiments according to the present disclosure.

FIG. 13A is a schematic diagram of a structure of a touch-sensing display substrate in some embodiments according to the present disclosure. FIG. 13B is a schematic diagram of a structure of a touch-sensing display substrate in some embodiments according to the present disclosure. In some embodiments, referring to FIG. 13A and FIG. 13B, the touch-sensing display substrate includes a plurality of first touch-sensing electrodes 10 arranged along a first direction D1. Optionally, a respective one of the plurality of first touch-sensing electrodes 10 extends along a second direction D2 different from the first direction D1.

In some embodiments, the touch-sensing display substrate further includes a plurality of first apertures 101 respectively extending through a thickness of a respective one of the plurality of first touch-sensing electrodes 10. Optionally, the plurality of first apertures 101 are arranged along the second direction D2.

In some embodiments, the touch-sensing display substrate further includes a plurality of second touch-sensing electrodes 20 crossing over the plurality of first touch-sensing electrodes 10. Optionally, the plurality of second touch-sensing electrodes 20 are arranged along the second direction D2. Optionally, a respective one of the plurality of second touch-sensing electrodes 20 extends along the first direction.

Optionally, the respective one of the plurality of second touch-sensing electrodes 20 includes a plurality of second touch-sensing sub-electrodes 201. Optionally, one of the plurality of second touch-sensing sub-electrodes 201 of the respective one of the plurality of second touch-sensing electrodes 20 is in a region corresponding to one of the plurality of first apertures 101 corresponding to the respective one of the plurality of first touch-sensing electrodes 10.

In some embodiments, the touch-sensing display substrate further includes a plurality of third apertures 103 respectively extending through of a thickness of the respective one of the plurality of first touch-sensing electrodes 10. Optionally, the plurality of third apertures 103 are arranged along the second direction D2.

In some embodiments, the touch-sensing display substrate further includes a plurality of signal lines SL. Optionally, the plurality of signal lines SL include a first signal line SL1 and a second signal line SL2. Optionally, the first signal line SL1 of the plurality of signal lines SL extends along the second direction D1 and crosses over the plurality of first apertures 101 in one of the plurality of first touch-sensing electrodes 10 but not the plurality of third apertures 103 in any first touch-sensing electrode. Optionally, the second signal line SL2 of the plurality of signal lines extends along the second direction D2 and crosses over the plurality of third apertures 103 in a same as or different from the one of the plurality of first touch-sensing electrodes 10 crossed-over by the first signal line, but not the plurality of first apertures 101 in any first touch-sensing electrode. For example, a respective one of the plurality of signal lines SL cannot cross over both one of the plurality of first apertures 101 and one of the plurality of third apertures 103.

Optionally, the plurality of signal lines SL are gate lines or data lines. Optionally, the first signal line and the second signal line are configured to transmit signals of a same type.

Optionally, the plurality of signal lines SL further includes a third signal lines SL3 extending along the second direction D1 without crossing over any one of the plurality of first apertures 101 and any one of the plurality of third apertures 103.

Optionally, the respective one of the plurality of first touch-sensing electrodes 10 is a transmitting (TX) electrode (e.g., a scanning electrode), and the respective one of the plurality of second touch-sensing electrodes 20 is a receiving (RX) electrode (e.g., a sensing electrode). Optionally, the respective one of the plurality of second touch-sensing electrodes 20 is a transmitting (TX) electrode, and the respective one of the plurality of first touch-sensing electrodes 10 is a receiving (RX) electrode.

Referring to FIG. 13A, in one example, the plurality of first apertures 101 extending through the respective one of the plurality of first touch-sensing electrodes 10 are arranged in multiple rows. The plurality of second touch-sensing sub-electrodes 201 in the respective one of the plurality of second touch-sensing electrodes 20 are arranged in multiple columns. In a region where multiple row regions corresponding to the plurality of first apertures 101 overlaps with the multiple column regions corresponding to the plurality of second touch-sensing sub-electrodes 201, there are multiple first apertures and multiple second touch-sensing sub-electrodes, and a respective second touch-sensing sub-electrodes 201 is in a region corresponding to a respective first apertures 101. The multiple second touch-sensing sub-electrodes increase a perimeter of the respective one of the plurality of the second touch-sensing electrodes 20, so, perimeters of the multiple second touch-sensing sub-electrodes electrically coupled with the respective one of the plurality of first touch-sensing electrodes 10 are increased, which also increases fringe field capacitance between the respective one of the plurality of first touch-sensing electrodes 10 and the respective one of the plurality of second touch-sensing electrodes 20.

For example, in the region where multiple row regions corresponding to the plurality of first apertures 101 overlaps with the multiple column regions corresponding to the plurality of second touch-sensing sub-electrodes 201, there are multiple first apertures arranged in an array having a size of M×N. and multiple second touch-sensing sub-electrodes arranged in an array having a size of M×N, wherein M and N are positive integers, M≥2, and N≥2.

Referring to FIG. 13B, in another example, the plurality of first apertures 101 are arranged in one row. The plurality of second touch-sensing sub-electrodes 201 are arranged in one column. In a region where a row region corresponding to the plurality of first apertures 101 overlaps with a column region corresponding to the plurality of second touch-sensing sub-electrodes 201, there are one first aperture and one second touch-sensing sub-electrodes, and a respective second touch-sensing sub-electrodes 201 is in a region corresponding to a respective first apertures 101.

In some embodiment, referring to FIG. 13A, each of substantially all of the plurality of signal lines SL crosses over multiple apertures in one of the plurality of first touch-sensing electrodes 10. Optionally, substantially all of the plurality of signal lines includes a first group of signal lines SLG1 and a second group of signal lines SLG2. Optionally, a respective one of the first group of signal lines SLG1 crosses over multiple first apertures of the plurality of first apertures 101 in a corresponding one of the plurality of first touch-sensing electrodes 10. Optionally, a respective one of the second group of signal lines SLG2 crosses over multiple third apertures of the plurality of third apertures 103 in a corresponding one of the plurality of first touch-sensing electrodes 10.

As used herein, the term "substantially all" refers to a value which is at least 80%, e.g., at least 80%, at least 85%, at least 90%, at least 95%, at least 99%, and 100%.

Optionally, the first group of signal lines SLG1 includes the first signal line SL1. Optionally, the second group of signal lines SLG2 includes the second signal line SL2.

Optionally, the plurality of signal lines SL do not include any third signal line SL3 for example, a respective one of the all of the plurality of signal lines crosses over multiple first apertures of the plurality of first apertures 101 in a corresponding one of the plurality of first touch-sensing electrodes, or crosses over multiple third apertures of the plurality of third apertures in a corresponding one of the plurality of first touch-sensing electrodes. Because a number of third signal lines is far more less than a number of the first signal lines and than a number of the second signal lines, and a difference, between a signal coupling of one third signal line and one of the plurality of first touch-sensing electrodes and a signal coupling of one first or second signal line and one of the plurality of first touch-sensing electrodes, is greater than a difference, between a signal coupling of one first signal line and one of the plurality of first touch-sensing electrodes and a signal coupling of one second signal line and one of the plurality of first touch-sensing electrode, it is better that each signal line crosses over the plurality of first apertures 101 or the plurality of third apertures 103.

The plurality of first apertures 101 extend through the respective one of the plurality of first touch-sensing electrodes 10. When signal lines cross over the respective one of the plurality of first touch-sensing electrodes 10 along the first direction D1 or along the second direction D2, some signal lines may extends through regions corresponding to the plurality of first apertures 101 whereas some other signal lines may extends through regions without the plurality of first apertures 101. The signal lines are electrically coupled with the respective one of the plurality of first touch-sensing electrodes 10. Coupling areas of the respective one of the plurality of first touch-sensing electrodes 10 respectively with different signal lines in different positions, however, may be different due to the presence or absence of the plurality of first apertures 101. This difference in turn may lead to different coupling strength of signal coupling induced by signals in different signal lines with respect to the respective one of the plurality of first touch-sensing electrodes 10.

Because the touch-sensing display substrate is absent of any aperture extending through the respective one of the plurality of second touch-sensing electrodes 20, different signal lines in different position may have a same electrical coupling area with respect to different second touch-sensing electrodes 20. Accordingly, coupling areas of the respective one of the plurality of second touch-sensing electrodes 20 respectively with different signal lines in different position are substantially the same; and coupling strength of signal coupling induced by signals in the different signal lines with respect to different second touch-sensing electrodes 20 is substantially the same.

In some embodiments, the plurality of first touch-sensing electrodes 10 and the plurality of second touch-sensing electrodes 20 can be used as a common electrode. So, the plurality of first touch-sensing electrodes 10 and the plurality of second touch-sensing electrodes 20 can be used to perform either the touch-control function or the display function. Moreover, the touch-control function and the display function can be performed at the same time, which can obviate the issue of insufficient charging time of data lines in a display apparatus having high resolution and to let the display apparatus compatible with an active pen. Also, comparing with display substrate having both the common electrode and the touch-sensing electrodes, the touch-sensing display substrate described herein, using the touch-sensing electrodes as the common electrode, can be thinner.

In some embodiments, the plurality of first touch-sensing electrodes 10 and the plurality of second touch-sensing electrodes 20 are in a same layer and includes a same materials. So, the plurality of first touch-sensing electrodes 10 and the plurality of second touch-sensing electrodes 20 can be formed in a same process, which can simplify the process of fabricating the touch-sensing display substrate.

Various appropriate electrode materials and various appropriate fabricating methods may be used to make the plurality of first touch-sensing electrodes and the plurality of second touch-sensing electrodes. Examples of appropriate electrode materials for making the plurality of first touch-sensing electrodes and the plurality of second touch-sensing electrodes include, but are not limited to, Indium Tin Oxide (ITO), and Indium Zinc Oxide (IZO).

Because voltages applied to the plurality of gate lines are greater than voltages applied to the plurality of data lines, difference gate lines having different signal couplings with respect to the respective one of the plurality of first touch-sensing electrodes, and different data lines having different signal couplings with respect to the respective one of the plurality of first touch-sensing electrodes, differences between difference signal couplings between the gate lines and the respective one of the plurality of first touch-sensing electrodes are greater than differences between difference signal couplings between the data lines and the respective one of the plurality of first touch-sensing electrodes. The difference may lead to different signal couplings between signals in different signal lines and the corresponding first touch-sensing electrodes.

Referring to FIG. 13A, since the first signal line SL1 of the plurality of signal lines SL crosses over the plurality of first apertures 101 in one of the plurality of first touch-sensing electrodes, and the second signal line SL2 of the plurality of signal lines SL crosses over the plurality of third apertures 103 in a same as or different from the one of the plurality of first touch-sensing electrodes crossed-over by the first signal line. The difference between a signal coupling, between the first signal line SL1 and the one of the plurality of first touch-sensing electrodes, and a signal coupling, between the second signal line SL2 and the one of the plurality of first touch-sensing electrodes (or a different one of the plurality of first touch-sensing electrode), is decreased due to the exists of the plurality of third apertures 103. So, when the plurality of first touch-sensing electrodes 10 and the plurality of second touch-sensing electrodes 20 are used as a common electrodes, the signal coupling difference between different regions of the touch-sensing display substrate is reduced, which can avoid equidistant horizontal stripes displayed by the touch-sensing display substrate.

In some embodiments, a total length of portions of the first signal line SL1 crossing over the plurality of first apertures 101 is different from a total length of portions of the second signal line SL2 crossing over the plurality of third apertures 103.

In some embodiments, a total length of portions of the first signal line SL1 crossing over the plurality of first apertures 101 is substantially same as a total length of portions of the second signal line SL2 crossing over the plurality of third apertures 103.

As used herein, the term "substantially same" refers to a difference between two values not exceeding 10% of a base value (e.g., one of the two values), e.g., not exceeding 8%, not exceeding 6%, not exceeding 4%, not exceeding 2%, not exceeding 1%, not exceeding 0.5%, not exceeding 0.1%, not exceeding 0.05%, and not exceeding 0.01%, of the base value.

Optionally, a length L1 of a portion of the first signal line SL1 crossing over one of the plurality of first apertures 101 is different from a length L2 of a portion of the second signal line SL2 crossing over the one of the plurality of third apertures 103.

Optionally, a length L1 of a portion of the first signal line SL1 crossing over one of the plurality of first apertures 101 is substantially same as a length L2 of a portion of the second signal line SL2 crossing over the one of the plurality of third apertures 103.

In some embodiments, a respective first aperture of the plurality of first apertures 101 and a respective third aperture of the plurality of third apertures 103 are arranged along the first direction D1. Because, the length L1 of a portion of the first signal line SL crossing over the respective first aperture is substantially same as the length L2 of a portion of the second signal line SL2 crossing over the respective third aperture, the portion of the first signal line SL1 crossing over the respective first aperture will have a signal coupling with respect to a portion of the respective first electrode surrounding the respective first aperture is substantially same as a signal coupling between the portion of the second signal lines SL2 crossing over the respective third aperture and a portion of the respective first electrode surrounding the respective third aperture.

Optionally, the first signal line SL1 respectively crosses over each of the plurality of first apertures 101 by a substantially same first length L1'. Optionally, the second signal line SL2 respectively crosses over each of the plurality of third apertures 103 by a substantially same second length L2'. Optionally, the substantially same first length L1' and the substantially same second length L2' are substantially same. So, the first signal line SL crossing over the respective first aperture will have a signal coupling with respect to the respective first electrode is substantially same as a signal coupling between the second signal lines SL2 and the respective first electrode, which ensures an uniformity of signal couplings between the plurality of first touch-sensing electrodes 10 and the plurality of signal lines, and avoid equidistant horizontal stripes to improve the display quality.

Optionally, the respective one of the plurality of third aperture 103 is connected to at least one of the plurality of second aperture 102.

In another aspect, the present disclosure also provides a touch-sensing display apparatus including the touch-sensing display substrate described herein.

In some embodiments, the touch-sensing display apparatus is operated in a time division mode including a display mode and a touch control mode. Optionally, in the display mode, the plurality of first touch-sensing electrodes are used as a common electrode and are configured to be provided with a common voltage. Optionally, in the display mode, the plurality of first touch-sensing electrodes and the plurality of second touch-sensing electrodes are used as a common electrode and are configured to be provided with a common voltage Optionally, in the touch control mode, the plurality of first touch-sensing electrodes are a plurality of touch-sensing electrodes configured to transmit touch signals. Optionally, in the touch control mode, the plurality of second touch-sensing electrodes are a plurality of touch-scanning electrodes configured to transmit scanning signals.

Optionally, in the touch control mode, the plurality of second touch-sensing electrodes are a plurality of touch-sensing electrodes configured to transmit touch signals. Optionally, in the touch control mode, the plurality of first touch-sensing electrodes are a plurality of touch-scanning electrodes configured to transmit scanning signals.

Optionally, the touch-sensing display apparatus includes one or more integrated circuits connected to the touch-sensing display substrate. Examples of appropriate touch-sensing display apparatuses include, but are not limited to, an electronic paper, a mobile phone, a tablet computer, a television, a monitor, a notebook computer, a digital album, a GPS, wireless devices, personal data assistants (PDAs), handheld or portable computers, GPS receivers/navigators, cameras, MP4 video players, camcorders, game consoles, watches, clocks, calculators, TV monitors, flat panel display, computer monitor, car display (e.g., odometer display, etc.), navigator, cockpit controller and/or display, camera view display (e.g., rear view camera display in a vehicle), electronic photo, electronic Billboards or signs, projectors, architectural structures, packaging, and aesthetic structures (e.g., displays for images of a piece of jewelry), etc.

In another aspect, the present disclosure also provides a method of operating a touch-sensing display apparatus. In some embodiments, the method of operating a touch-sensing display apparatus includes operating a touch-sensing display apparatus in a time division mode including a display mode and a touch control mode.

Optionally, in the display mode, the method of operating the touch-sensing display apparatus includes applying a common voltage to a plurality of first touch-sensing electrodes. Optionally, the method of operating the touch-sensing display apparatus further includes applying a common voltage to a plurality of second touch-sensing electrodes.

Optionally, in the touch control mode, the method of operating the touch-sensing display apparatus includes transmitting touch signals using the plurality of first touch-sensing electrodes. Optionally, the method of operating the touch-sensing display apparatus further includes transmitting scanning signals using the plurality of second touch-sensing electrodes.

Optionally, in the touch control mode, the method of operating the touch-sensing display apparatus includes transmitting touch signals using the plurality of second touch-sensing electrodes. Optionally, the method of operating the touch-sensing display apparatus further includes transmitting scanning signals using the plurality of first touch-sensing electrodes.

In another aspect, the present disclosure also provides a method of fabricating a touch-sensing display substrate. In some embodiments, the method of fabricating a touch-sensing display substrate includes forming a touch-sensing structure on a base substrate. Optionally, forming the touch-sensing structure includes forming a plurality of first touch-sensing signal lines and a plurality of first touch-sensing electrodes, a respective one of the plurality of first touch-sensing signal lines formed to cross over the plurality of first touch-sensing electrodes; forming a first insulating layer between the plurality of first touch-sensing signal lines and the plurality of first touch-sensing electrodes; and forming a plurality of first vias at least partially extending into the first insulating layer in regions where the plurality of first touch-sensing signal lines cross over the plurality of first touch-sensing electrodes. Optionally, the plurality of first vias are formed to include at least a through-hole via, through which the respective one of the plurality of first touch-sensing signal lines is electrically connected to a corresponding first touch-sensing electrode. Optionally, the plurality of first vias are formed to include at least a blind via partially extending into the first insulating layer in a region where the respective one of the plurality of first touch-sensing signal lines crosses over one of the plurality of first touch-sensing electrodes other than the corresponding first touch-sensing electrode. Optionally, the respective one of the plurality of first touch-sensing signal lines is formed to be insulated from the one of the plurality of first touch-sensing electrodes other than the corresponding first touch-sensing electrode.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch-sensing display substrate, comprising a touch-sensing structure configured to detect a touch position;
   wherein the touch-sensing structure comprises:
   a plurality of first touch-sensing signal lines;
   a plurality of first touch-sensing electrodes; and
   a first insulating layer between the plurality of first touch-sensing signal lines and the plurality of first touch-sensing electrodes;
   wherein a respective one of the plurality of first touch-sensing signal lines crosses over the plurality of first touch-sensing electrodes;
   a plurality of first vias at least partially extend into the first insulating layer in regions where the plurality of first touch-sensing signal lines cross over the plurality of first touch-sensing electrodes;
   the plurality of first vias comprises at least a through-hole via, through which the respective one of the plurality of first touch-sensing signal lines is electrically connected to a corresponding first touch-sensing electrode;
   the plurality of first vias comprise at least a blind via partially extending into the first insulating layer in a region where the respective one of the plurality of first touch-sensing signal lines crosses over one of the plurality of first touch-sensing electrodes other than the corresponding first touch-sensing electrode; and
   the respective one of the plurality of first touch-sensing signal lines is insulated from the one of the plurality of first touch-sensing electrodes other than the corresponding first touch-sensing electrode;
   wherein the first insulating layer comprises a first insulating sub-layer on the plurality of first touch-sensing signal lines, and a second insulating sub-layer on a side of the first insulating sub-layer away from the plurality of first touch-sensing signal lines;
   the through-hole via comprises a first sub-via extending through the first insulating sub-layer, and a second sub-via extending through the second insulating sub-layer;
   the first sub-via is connected with the second sub-via, allowing the respective one of the plurality of first touch-sensing signal lines to be electrically connected to the corresponding first touch-sensing electrode through the first sub-via and the second sub-via; and
   the blind via extends into at least the second insulating sub-layer but does not extend through the first insulating sub-layer.

2. The touch-sensing display substrate of claim 1, wherein any via of the plurality of first vias in regions where the respective one of the plurality of first touch-sensing signal lines crosses over first touch-sensing electrodes other than the corresponding first touch-sensing electrode is a blind via.

3. The touch-sensing display substrate of claim 1, wherein any via of the plurality of first vias in a region where the respective one of the plurality of first touch-sensing signal lines crosses over the corresponding first touch-sensing electrode is a through-hole via.

4. The touch-sensing display substrate of claim 1, wherein a total number of vias of the plurality of first vias in each region where the respective one of the plurality of first touch-sensing signal lines crosses over each of the plurality of first touch-sensing electrodes is substantially same.

5. The touch-sensing display substrate of claim 1, wherein a respective one of the plurality of first touch-sensing electrodes crosses over the plurality of first touch-sensing signal lines respectively forming a plurality of cross-over regions;
   the respective one of the plurality of first touch-sensing electrodes is electrically connected to a corresponding first touch-sensing signal line through the through-hole via;
   the respective one of the plurality of first touch-sensing electrodes is insulated from the plurality of first touch-sensing signal lines other than the corresponding first touch-sensing signal line;
   the plurality of first vias comprise at least one blind via partially extending into the first insulating layer in a region where the respective one of the plurality of first touch-sensing electrodes crosses over first touch-sensing signal lines other than the corresponding first touch-sensing signal line.

6. The touch-sensing display substrate of claim 5, wherein any via of the plurality of first vias in regions where the respective one of the plurality of first touch-sensing electrodes crosses over first touch-sensing signal lines other than the corresponding first touch-sensing signal line is a blind via.

7. The touch-sensing display substrate of claim 5, wherein a total number of vias of the plurality of first vias in each of the plurality of cross-over regions is substantially same.

8. The touch-sensing display substrate of claim 1, wherein the respective one of the plurality of first touch-sensing signal lines crosses over the plurality of first touch-sensing electrodes along a cross-over direction; and
   a column of multiple first vias along the cross-over direction of the plurality of first vias are evenly distributed.

9. A touch-sensing display substrate, comprising a touch-sensing structure configured to detect a touch position;
   wherein the touch-sensing structure comprises:
   a plurality of first touch-sensing signal lines;
   a plurality of first touch-sensing electrodes; and
   a first insulating layer between the plurality of first touch-sensing signal lines and the plurality of first touch-sensing electrodes;
   wherein a respective one of the plurality of first touch-sensing signal lines crosses over the plurality of first touch-sensing electrodes;
   a plurality of first vias at least partially extend into the first insulating layer in regions where the plurality of first touch-sensing signal lines cross over the plurality of first touch-sensing electrodes;

the plurality of first vias comprises at least a through-hole via, through which the respective one of the plurality of first touch-sensing signal lines is electrically connected to a corresponding first touch-sensing electrode;

the plurality of first vias comprise at least a blind via partially extending into the first insulating layer in a region where the respective one of the plurality of first touch-sensing signal lines crosses over one of the plurality of first touch-sensing electrodes other than the corresponding first touch-sensing electrode; and the respective one of the plurality of first touch-sensing signal lines is insulated from the one of the plurality of first touch-sensing electrodes other than the corresponding first touch-sensing electrode;

wherein the touch-sensing display substrate further comprises:

a plurality of auxiliary electrodes respectively connecting the plurality of first touch-sensing electrodes with the plurality of first touch-sensing signal lines; and a second insulating layer between the plurality of auxiliary electrodes and a structure comprising the plurality of first touch-sensing electrodes and the plurality of first touch-sensing signal lines.

10. The touch-sensing display substrate of claim 9, further comprising a plurality of second vias respectively extending through the second insulating layer;

wherein a respective one of the plurality of auxiliary electrodes is electrically connected to the respective one of the plurality of first touch-sensing electrodes through a respective one of the plurality of second vias.

11. The touch-sensing display substrate of claim 9, further comprising a plurality of third vias respectively extending through the second insulating layer;

wherein a respective one of the plurality of auxiliary electrodes extends through a respective one of the plurality of third vias; and the respective one of the plurality of third vias is connected with the respective one of the plurality of first vias.

12. The touch-sensing display substrate of claim 11, wherein, in a region corresponding to the through-hole via, the respective one of the plurality of third vias is connected with the through-hole via; and the respective one of the plurality of auxiliary electrodes is electrically connected to the respective one of the plurality of first touch-sensing signal lines through the respective one of the plurality of third vias and the through-hole via.

13. The touch-sensing display substrate of claim 11, in a region corresponding to the blind via, further comprising a plurality of fourth vias and a plurality of fifth vias at least partially extending into the second insulating layer;

wherein the blind via comprises a first blind sub-via and a second blind sub-via;

the respective one of the plurality of fourth vias is connected with the first blind sub-via;

the respective one of the plurality of fifth vias is connected with the second blind sub-via;

the respective one of the plurality of auxiliary electrodes is electrically connected to the respective one of the plurality of first touch-sensing electrodes through the respective one of the plurality of fourth vias and the first blind sub-via or through the respective one of the plurality of fifth vias and the second blind sub-via.

14. The touch-sensing display substrate of claim 9, wherein further comprising a second blind via partially extending into the first insulating layer;

the respective one of the plurality of auxiliary electrodes at least partially extends into the second blind via; and the region corresponding to the blind via and the region corresponding to the second blind via are non-overlapping.

15. The touch-sensing display substrate of claim 9, further comprising a plurality of pixel electrodes respectively in a plurality of subpixel regions; and a plurality of thin film transistors respectively driving image display in a plurality of subpixels;

a drain electrode of a respective one of the plurality of thin film transistors is electrically connected to a respective one of the plurality of pixel electrodes;

wherein the plurality of auxiliary electrodes and the plurality of pixel electrodes are in a same layer and comprise a same material.

16. The touch-sensing display substrate of claim 1, further comprising:

a plurality of second touch-sensing electrodes; and a plurality of second touch-sensing signal lines;

wherein a respective one of the plurality of second touch-sensing signal lines is electrically connected to one of the plurality of second touch-sensing electrodes;

the respective one of the plurality of second touch-sensing signal lines is substantially parallel to the plurality of second touch-sensing electrodes; and an orthographic projection of the respective one of the plurality of second touch-sensing signal lines on a base substrate at least partially overlaps with an orthographic projection of the one of the plurality of second touch-sensing electrodes on the base substrate.

17. The touch-sensing display substrate of claim 16, further comprising a plurality of first apertures respectively extending through a thickness of the respective one of the plurality of first touch-sensing electrodes;

wherein the respective one of the plurality of second touch-sensing electrodes comprises a plurality of second touch-sensing sub-electrodes;

in a region where the respective one of the plurality of first touch-sensing electrodes crosses over a respective one of the plurality of second touch-sensing electrodes, second touch-sensing sub-electrodes are in a region corresponding to one or more first apertures;

one of the second touch-sensing sub-electrodes of the respective one of the plurality of second touch-sensing electrodes is in a region corresponding to one of the plurality of first apertures corresponding to the respective one of the plurality of first touch-sensing electrodes;

the respective one of the plurality of second touch-sensing signal lines connects a column of second touch-sensing sub-electrodes of the plurality of second touch-sensing sub-electrodes in the respective one of the plurality of second touch-sensing electrodes.

18. A touch-sensing display substrate, comprising a touch-sensing structure configured to detect a touch position;

wherein the touch-sensing structure comprises: a plurality of first touch-sensing signal lines;

a plurality of first touch sensing electrodes; and a first insulating layer between the plurality of first touch-sensing signal lines and the plurality of first touch-sensing electrodes, wherein a respective one of the plurality of first touch-sensing signal lines crosses over the plurality of first touch-sensing electrodes;

a plurality of first vias at least partially extend into the first insulating layer in regions where the plurality of first touch-sensing signal lines cross over the plurality of first touch-sensing electrodes;

the plurality of first vias comprises at least a through-hole via, through which the respective one of the plurality of first touch-sensing signal lines is electrically connected to a corresponding first touch-sensing electrode;

the plurality of first vias comprise at least a blind via partially extending into the first insulating layer in a region where the respective one of the plurality of first touch-sensing signal lines crosses over one of the plurality of first touch-sensing electrodes other than the corresponding first touch-sensing electrode;

and the respective one of the plurality of first touch-sensing signal lines is insulated from the one of the plurality of first touch-sensing electrodes other than the corresponding first touch-sensing electrode;

wherein the touch-sensing display substrate further comprises: a plurality of second touch-sensing electrodes;

a plurality of second touch-sensing signal lines;

a plurality of first apertures respectively extending through a thickness of the respective one of the plurality of first touch-sensing electrodes;

and a plurality of second apertures respectively extending through the respective one of the plurality of first touch-sensing electrodes;

wherein a respective one of the plurality of second touch-sensing signal lines is electrically connected to one of the plurality of second touch-sensing electrodes;

the respective one of the plurality of second touch-sensing signal lines is substantially parallel to the plurality of second touch-sensing electrodes;

an orthographic projection of the respective one of the plurality of second touch-sensing signal lines on a base substrate at least partially overlaps with an orthographic projection of the one of the plurality of second touch-sensing electrodes on the base substrate;

the respective one of the plurality of second touch-sensing electrodes comprises a plurality of second touch-sensing sub-electrodes;

in a region where the respective one of the plurality of first touch-sensing electrodes crosses over a respective one of the plurality of second touch-sensing electrodes, second touch-sensing sub-electrodes are in a region corresponding to one or more first apertures;

one of the second touch-sensing sub-electrodes of the respective one of the plurality of second touch-sensing electrodes is in a region corresponding to one of the plurality of first apertures corresponding to the respective one of the plurality of first touch-sensing electrodes;

and the respective one of the plurality of second touch-sensing signal lines connects a column of second touch-sensing sub-electrodes of the plurality of second touch-sensing sub-electrodes in the respective one of the plurality of second touch-sensing electrodes;

wherein any signal line that crosses over multiple first apertures of the plurality of first apertures in multiple first touch-sensing electrodes of the plurality of first touch-sensing electrodes is absent in regions corresponding to the plurality of second apertures;

and any signal line that crosses over multiple second apertures of the plurality of second apertures in multiple first touch-sensing electrodes of the plurality of first touch-sensing electrodes is absent in regions corresponding to the plurality of first apertures.

19. A touch-sensing display apparatus, comprising the touch-sensing display substrate of claim 1, and one or more integrated circuits connected to the touch-sensing display substrate.

20. The touch-sensing display apparatus of claim 19, wherein the touch-sensing display apparatus is operated in a time division mode comprising a display mode and a touch control mode;

wherein, in the display mode, the plurality of first touch-sensing electrodes are used as a common electrode and are configured to be provided with a common voltage;

wherein, in the touch control mode, the plurality of first touch-sensing electrodes are a plurality of touch-sensing electrodes configured to transmit touch signals.

* * * * *